United States Patent
Kamoshida et al.

(10) Patent No.: US 9,511,458 B2
(45) Date of Patent: Dec. 6, 2016

(54) HEAT EXCHANGER WITH THERMAL STORAGE FUNCTION AND METHOD OF MANUFACTURING THE SAME

(71) Applicant: KEIHIN THERMAL TECHNOLOGY CORPORATION, Oyama-shi (JP)

(72) Inventors: Osamu Kamoshida, Oyama (JP); Mitsuru Nobusue, Oyama (JP)

(73) Assignee: KEIHIN THERMAL TECHNOLOGY CORPORATION, Oyama-Shi (JP)

( * ) Notice: Subject to any disclaimer, the term of this patent is extended or adjusted under 35 U.S.C. 154(b) by 387 days.

(21) Appl. No.: 13/870,987

(22) Filed: Apr. 26, 2013

(65) Prior Publication Data

US 2013/0284395 A1   Oct. 31, 2013

(30) Foreign Application Priority Data

Apr. 27, 2012  (JP) ................................ 2012-102851

(51) Int. Cl.

| | |
|---|---|
| *B23P 15/26* | (2006.01) |
| *F28D 20/00* | (2006.01) |
| *F28D 1/053* | (2006.01) |
| *F28D 20/02* | (2006.01) |

(Continued)

(52) U.S. Cl.
CPC ........... *B23P 15/26* (2013.01); *F28D 1/05391* (2013.01); *F28D 20/00* (2013.01); *F28D 20/02* (2013.01); *F28D 2020/0008* (2013.01); *F28D 2020/0069* (2013.01);

(Continued)

(58) Field of Classification Search
CPC .................. F28D 1/05391; F28D 20/02; F28D 2020/0008; F28D 20/00; F28D 2020/0069; F28D 2021/0085; F28D 15/0283; B23P 15/26; F28F 9/0246; F28F 2220/00; F28F 9/005; Y10T 29/4935; Y02E 60/145

(Continued)

(56) References Cited

U.S. PATENT DOCUMENTS

| | | | | |
|---|---|---|---|---|
| 4,220,196 | A | * | 9/1980 | Gawron et al. ............... 165/11.1 |
| 4,744,505 | A | * | 5/1988 | Calleson ................... 29/890.044 |

(Continued)

FOREIGN PATENT DOCUMENTS

JP       2011-012947         1/2011

*Primary Examiner* — Allana Lewin Bidder
*Assistant Examiner* — Raheena Rehman
(74) *Attorney, Agent, or Firm* — Mori & Ward, LLP

(57) ABSTRACT

A heat exchanger with a thermal storage function includes a plurality of heat exchange tubes, a plurality of thermal storage material containers, and a first thermal storage material charging member. A circumferential wall of the first thermal storage material charging member is deformed such that a collapsed portion is formed on the first thermal storage material charging member and the thermal storage material charging passage is closed and sealed. The collapsed portion of the first thermal storage material charging member includes a first collapsed part and a second collapsed part. A relation T2<T1≤2t is satisfied where "t" represents a thickness of the circumferential wall of an uncollapsed portion of the first thermal storage material charging member, "T1" represents a thickness of the first collapsed part, and "T2" represents a thickness of the second collapsed part.

28 Claims, 11 Drawing Sheets

(51) Int. Cl.
  *F28F 9/02*      (2006.01)
  *F28D 21/00*     (2006.01)
(52) U.S. Cl.
  CPC .... *F28D 2021/0085* (2013.01); *F28F 9/0246*
      (2013.01); *F28F 2220/00* (2013.01); *Y02E*
      *60/145* (2013.01); *Y10T 29/4935* (2015.01)
(58) Field of Classification Search
  USPC ... 165/10, 153, 104.26; 62/285; 29/890.032;
                              220/612, 678–680
  See application file for complete search history.

(56) References Cited

U.S. PATENT DOCUMENTS

| | | | | |
|---|---|---|---|---|
| 6,230,407 | B1* | 5/2001 | Akutsu | F28D 15/0233 |
| | | | | 29/890.03 |
| 7,073,257 | B1* | 7/2006 | Hsu | F28D 15/0283 |
| | | | | 165/104.26 |
| 7,494,160 | B2* | 2/2009 | Lin | B21D 41/045 |
| | | | | 285/382 |
| 7,841,386 | B2* | 11/2010 | Wang et al. | 165/104.21 |
| 2006/0196632 | A1* | 9/2006 | Kudo | 165/10 |
| 2009/0178784 | A1* | 7/2009 | Wang | 165/104.26 |
| 2009/0242182 | A1* | 10/2009 | Moreau | 165/170 |
| 2010/0018231 | A1* | 1/2010 | Haller et al. | 62/238.6 |
| 2010/0251547 | A1* | 10/2010 | Yajima et al. | 29/890.03 |
| 2010/0300655 | A1* | 12/2010 | Liu et al. | 165/104.26 |
| 2010/0307144 | A1* | 12/2010 | Rudat et al. | 60/320 |
| 2010/0307180 | A1* | 12/2010 | Yamada et al. | 62/285 |
| 2010/0307720 | A1* | 12/2010 | Liu et al. | 165/104.26 |
| 2011/0192576 | A1* | 8/2011 | Wang | B01D 1/22 |
| | | | | 165/104.26 |
| 2012/0285662 | A1* | 11/2012 | Meyer et al. | 165/104.26 |

* cited by examiner

HEAT EXCHANGER WITH THERMAL STORAGE FUNCTION AND METHOD OF MANUFACTURING THE SAME

CROSS-REFERENCE TO RELATED APPLICATIONS

The present application claims priority under 35 U.S.C. §119 to Japanese Patent Application No. 2012-102851, filed Apr. 27, 2012. The contents of this application are incorporated herein by reference in their entirety.

BACKGROUND OF THE INVENTION

Field of the Invention

The present invention relates to a heat exchanger with a thermal storage function and a method of manufacturing the heat exchanger.

Discussion of the Background

For example, in order to protect the environment and improve fuel consumption of automobiles, there has been proposed an automobile designed to automatically stop the engine when the automobile stops, for example, so as to wait for a traffic light to change.

However, an ordinary car air conditioner has a problem in that, when the engine of an automobile in which the air conditioner is mounted is stopped, a compressor driven by the engine stops, and supply of refrigerant (medium for conveying cool) to an evaporator stops, whereby the cooling capacity of the air conditioner sharply drops.

One conceivable measure for solving such a problem is imparting a cool storage function to the evaporator, to thereby enable cooling of a vehicle compartment by releasing the cool stored in the evaporator, when the compressor stops as a result of stoppage of the engine.

Such an evaporator with a cool storage function has been proposed (see Japanese Patent Application Laid-Open (kokai) No. 2011-12947). In the proposed evaporator, a plurality of flat refrigerant flow tubes (heat exchange tubes) are disposed in parallel such that they are spaced from one another. The evaporator has air-passing clearances each formed between refrigerant flow tubes located adjacent to each other. Cool storage material containers filled with a cool storage material are disposed in some air-passing clearances, and outer fins are disposed in the remaining air-passing clearances. Each cool storage material container is formed by brazing together peripheral edge portions of two metal plates, and a cool storage material is charged into a cool storage material accommodation space provided between the two metal plates.

Although not clearly shown in the above-mentioned publication, a cool storage material charging inlet is formed in each cool storage material container so as to charge the cool storage material into the cool storage material container. After the cool storage material is charged into the cool storage material accommodation space through the cool storage material charging inlet, the cool storage material charging inlet must be closed.

Incidentally, in the case of the evaporator with a cool storage function disclosed in the above-mentioned publication, a conceivable simple way of forming the cool storage material charging inlet on each cool storage material container is providing an outward projecting semi-cylindrical portion at the peripheral edge of each metal plate, providing outward flanges along opposite side edges of the semi-cylindrical portion of each metal plate, and joining together the corresponding outward flanges of the semi-cylindrical portions of the two metal plates. Also, a conceivable simple way of closing such a cool storage material charging inlet is press-fitting a cylindrical columnar plug into the cool storage material charging inlet after charging of the cool storage material.

SUMMARY OF THE INVENTION

According to one aspect of the present invention, a heat exchanger with a thermal storage function includes a plurality of heat exchange tubes, a plurality of thermal storage material containers, and a first thermal storage material charging member. A medium is to flow through the heat exchange tubes. A thermal storage material is provided in the thermal storage material containers. Each of the thermal storage material containers is made of metal and provided such that heat of the medium which flows through the heat exchange tubes is transferred to the thermal storage material within each of the thermal storage material containers. Each of the thermal storage material containers includes a peripheral edge portion and a cylindrical portion provided at the peripheral edge portion to establish communication between an interior and an exterior of each of the thermal storage material containers. The first thermal storage material charging member has a cylindrical shape. The first thermal storage material charging member is made of metal and includes a thermal storage material charging passage and an inner circumferential surface formed by a metal bare material. The first thermal storage material charging member includes a first end and a second end opposite to the first end. The first end is provided in and brazed to the cylindrical portion of one of the thermal storage material containers. The second end projects from the cylindrical portion and is collapsed from opposite sides in a radial direction of the first thermal storage material charging member. A circumferential wall of the first thermal storage material charging member is deformed such that a collapsed portion is formed on the first thermal storage material charging member and the thermal storage material charging passage is closed and sealed. The collapsed portion of the first thermal storage material charging member includes a first collapsed part and a second collapsed part which is adjacent to the first collapsed part in a longitudinal direction of the first thermal storage material charging member and which is greater in degree of collapse than the first collapsed part. A relation T2<T1≤2t is satisfied where "t" represents a thickness of the circumferential wall of an uncollapsed portion of the first thermal storage material charging member, "T1" represents a thickness of the first collapsed part, and "T2" represents a thickness of the second collapsed part.

According to another aspect of the present invention, in a method of manufacturing a heat exchanger with a thermal storage function, a plurality of heat exchange tubes are prepared. A plurality of thermal storage material containers are prepared. Each of the thermal storage material containers has a cylindrical portion which establishes communication between an interior and an exterior of each of the thermal storage material containers. An end portion of a first thermal storage material charging member is inserted into the cylindrical portion of one of the thermal storage material containers. The first thermal storage material charging member has a cylindrical shape and being made of metal. The first thermal storage material charging member includes a thermal storage material charging passage and an inner circumferential surface formed by a metal bare material. The first thermal storage material charging member is brazed to the cylindrical portion of one of the thermal storage material containers. The heat exchange tubes and the thermal storage material containers are brazed together. A thermal storage material is charged into one of the thermal storage material containers through the first thermal storage material charging member. A first press die has a single pressing surface extending over an entirety of the first press die. A second press die has a convex portion at an intermediate position with respect to a longitudinal direction and is provided such that an end surface of the convex portion and surfaces of the second press die located on upper and lower sides of the convex portion serve as pressing surfaces. A portion of the first thermal storage material charging member projecting from the cylindrical portion from opposite sides in a radial direction is collapsed by the pressing surfaces of the first and second press dies so as to deform a circumferential wall of the first thermal storage material charging member such that a deformed part is formed on the first thermal storage material charging member and the thermal storage material charging passage is closed and sealed. A collapsed portion of the first thermal storage material charging member has a first collapsed part and a second collapsed part which is formed adjacent to the first collapsed part in a longitudinal direction of the first thermal storage material charging member and which is greater in degree of collapse than the first collapsed part. A relation $T2<T1\leq 2t$ is satisfied where "t" represents a thickness of the circumferential wall of an uncollapsed portion of the first thermal storage material charging member, "T1" represents a thickness of the first collapsed part, and "T2" represents a thickness of the second collapsed part.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
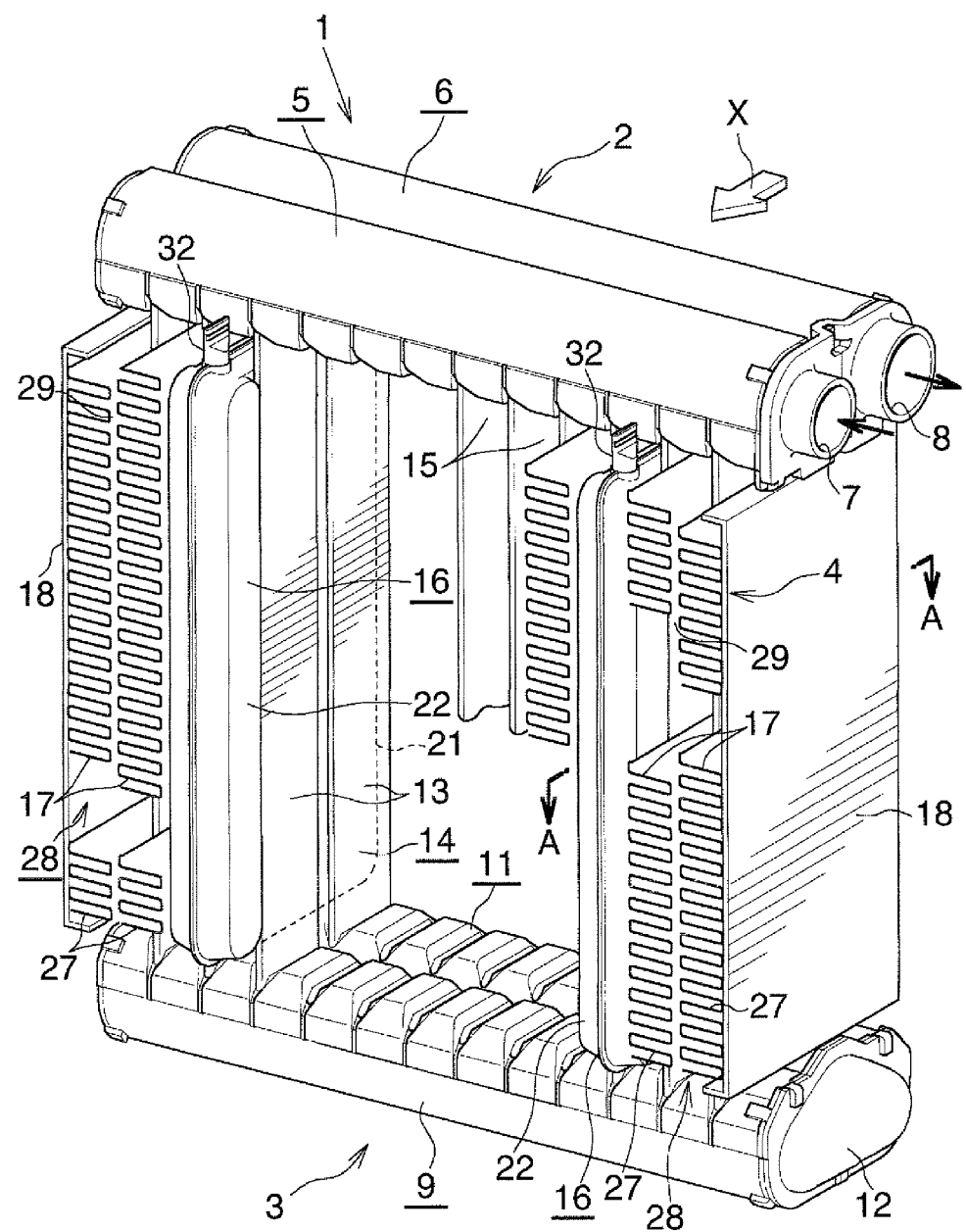
FIG. 1 is a partially cut-away perspective view showing the overall structure of an evaporator with a cool storage function to which a heat exchanger with a thermal storage function according to an embodiment is applied.

The embodiments will now be described with reference to the accompanying drawings, wherein like reference numerals designate corresponding or identical elements throughout the various drawings.

In this embodiment, a heat exchanger with a thermal storage function according to the embodiment is applied to an evaporator with a cool storage function (a function of storing cool).

Throughout the drawings, like portions and like members are denoted by the same reference numerals, and their descriptions will not be repeated.

In the following description, the downstream side with respect to an air-passing direction (a direction represented by arrow X in FIGS. 1 and 2) will be referred to as the "front," and the opposite side as the "rear." Also, the left-hand and right-hand sides of FIG. 1 will be referred to as "left" and "right," respectively.

Furthermore, the term "aluminum" as used in the following description encompasses aluminum alloys in addition to pure aluminum.

FIG. 1 shows the overall structure of an evaporator with a cool storage function to which the heat exchanger with a thermal storage function according to the embodiment is applied, and FIGS. 2 to 5 show the configuration of a main portion of the evaporator. Also, FIG. 6 shows a method of collapsing a cylindrical thermal storage material charging member so as to form a thermal storage material charging member shown in FIGS. 2 to 5.

As shown in FIG. 1, an evaporator 1 with a cool storage function (a heat exchanger with a thermal storage function) includes a first header tank 2 and a second header tank 3 formed of aluminum and disposed apart from each other in the vertical direction such that they extend in the left-right direction; and a heat exchange core section 4 provided between the two header tanks 2 and 3.

The first header tank 2 includes a leeward upper header section 5 located on the front side (downstream side with respect to the air-passing direction); and a windward upper header section 6 located on the rear side (upstream side with respect to the air-passing direction) and united with the leeward upper header section 5. A refrigerant inlet 7 is provided at the right end of the leeward upper header section 5, and a refrigerant outlet 8 is provided at the right end of the windward upper header section 6. The second header tank 3 includes a leeward lower header section 9 located on the front side, and a windward lower header section 11 located on the rear side and united with the leeward lower header section 9. The respective interiors of the leeward lower header section 9 and the windward lower header section 11 of the second header tank 3 are connected together via a communication member 12 which is joined to the right ends of the two lower header sections 9 and 11 and which has an inner space serving as a passage.

Figure 2:
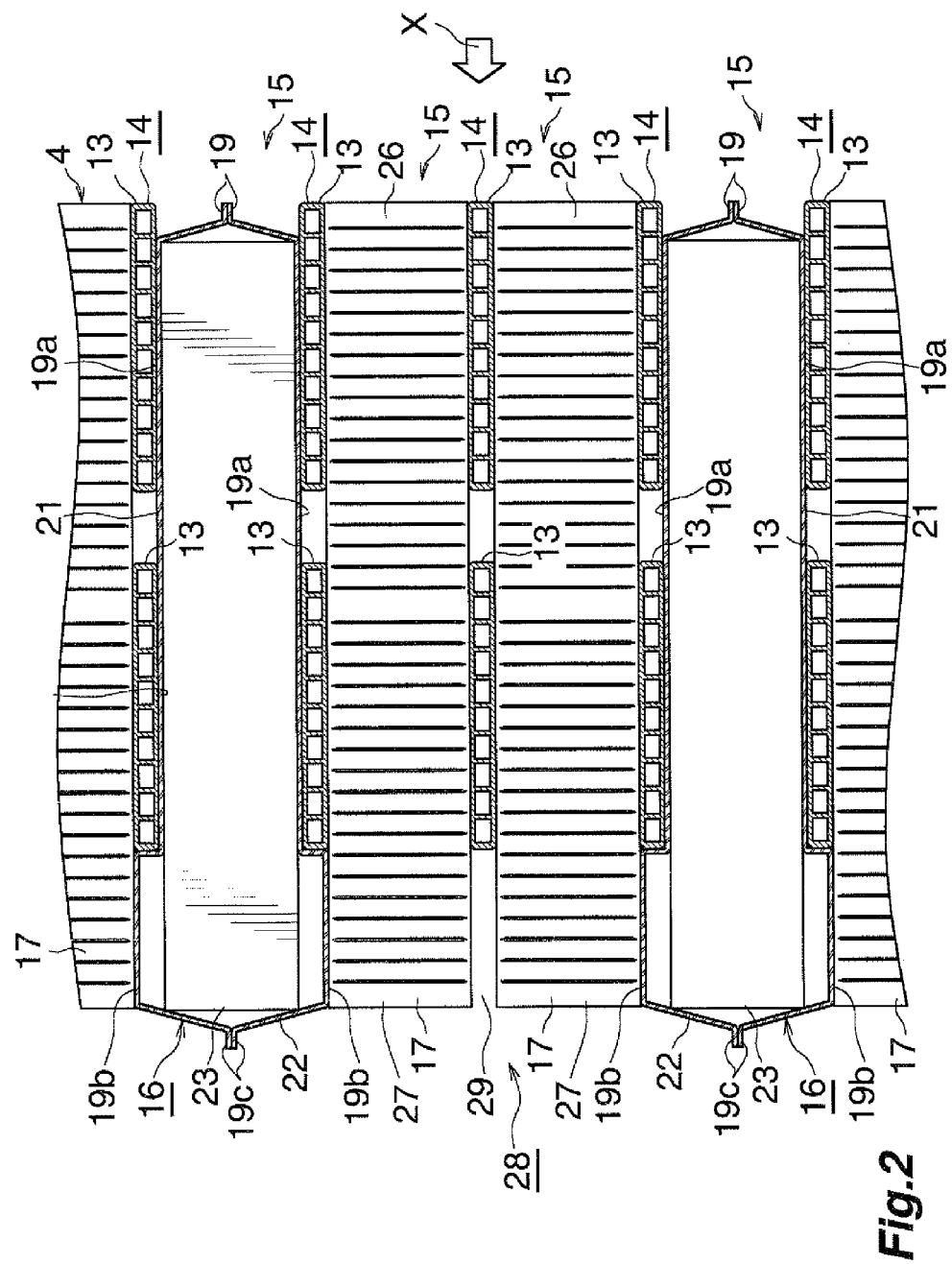
FIG. 2 is an enlarged sectional view taken along line A-A of FIG. 1.

As shown in FIGS. 1 and 2, in the heat exchange core section 4, a plurality of flat heat exchange tubes 13 which extend in the vertical direction, whose width direction coincides with the air-passing direction (the front-rear direction), and which are formed of aluminum extrudate are disposed in parallel such that they are spaced from one another in the left-right direction. In the present embodiment, a plurality of pairs 14 each composed of two heat exchange tubes 13 spaced from each other in the front-rear direction are disposed at predetermined intervals in the left-right direction. Air-passing clearances 15 are formed such that each air-passing clearance 15 is formed between adjacent two of the pairs 14 each composed of the front and rear heat exchange tubes 13. An upper end portion of each front heat exchange tube 13 is connected to the leeward upper header section 5, and a lower end portion of each front heat exchange tube 13 is connected to the leeward lower header section 9. Similarly, an upper end portion of each rear heat exchange tube 13 is connected to the windward upper header section 6, and a lower end portion of each rear heat exchange tube 13 is connected to the windward lower header section 11.

A flat cool storage material container 16 (thermal storage material container) which is formed of aluminum and which is filled with a cool storage material (not shown) for storing cool is disposed in each of air-passing clearances 15 selected from all the air-passing clearances 15 of the heat exchange core section 4, the selected air-passing clearances 15 being not adjacent from one another, such that the cool storage material container 16 extends over the front and rear heat exchange tubes 13 in a state in which its longitudinal direction coincides with the vertical direction and its width direction coincides with the front-rear direction. A corrugated outer fin 17 is disposed in each of the remaining air-passing clearances 15 such that the corrugated outer fin 17 extends over the front and rear heat exchange tubes 13. The outer fin 17 is formed from an aluminum brazing sheet having a brazing material layer on each of opposite surfaces thereof, and has crest portions extending in the front-rear direction, trough portions extending in the front-rear direction, and connection portions connecting the crest portions and the trough portions. Also, the outer fin 17, which is formed from an aluminum brazing sheet having a brazing material layer on each of opposite surfaces thereof, is disposed on the outer side of the pair 14 of the heat exchange tubes 13 located at the left end, and is disposed on the outer side of the pair 14 of the heat exchange tubes 13 located at the right end. A side plate 18 formed of aluminum is disposed on the outer side of each of the outer fins 17 located at the left and right ends, respectively, and is brazed to the corresponding outer fin 17. The spaces between the outer fins 17 and the side plates 18 located at the left and right ends also serve as air-passing clearances.

Each cool storage material container 16 has a container main body portion 21 and an outward projecting portion 22. The container main body portion 21 is located rearward of the front side edges of the front heat exchange tubes 13, and is brazed to the two (front and rear) heat exchange tubes 13 of each of the pairs 14 located on opposite sides of the container main body portion 21. The outward projecting portion 22 extends from the front side edge (leeward side edge) of the container main body portion 21, and projects frontward (outward in the air-passing direction) from the front side edges of the front heat exchange tubes 13. The entire container main body portion 21 of the cool storage material container 16 has a uniform dimension as measured in the left-right direction. The dimension of the outward projecting portion 22 of the cool storage material container 16 as measured in the vertical direction is equal to that of the container main body portion 21, and the dimension of the outward projecting portion 22 of the cool storage material container 16 as measured in the left-right direction is greater than that of the container main body portion 21 of the cool storage material container 16. Therefore, in relation to the container main body portion 21, the outward projecting portion 22 bulges outward in the left-right direction. The dimension of the outward projecting portion 22 as measured in the left-right direction is equal to a height obtained by adding the dimension of the container main body portion 21 of the cool storage material container 16 in the left-right direction to the double of a tube height, which is the dimension of each heat exchange tube 13 as measured in the left-right direction.

An inner fin 23 made of aluminum is disposed in each cool storage material container 16 such that the inner fin 23 extends from the rear end of the container main body portion 21 to the front end of the outward projecting portion 22 and extends over substantially the entire length of the cool storage material container 16 in the vertical direction. The inner fin 23 is a corrugated fin which has crest portions extending in the front-rear direction, trough portions extending in the front-rear direction, and connection portions connecting the crest portions and the trough portions. The inner fin 23 has a uniform fin height over the entirety thereof, and is brazed to the inner surfaces of the left and right side walls of the container main body portion 21 of the storage material container 16.

A paraffin-based latent heat storage material having an adjusted freezing point of about 5 to 10° C. is used as a cool storage material charged into each cool storage material container 16. Specifically, pentadecane, tetradecane, or the like is used. The cool storage material is charged into each cool storage material container 16 such that the cool storage material reaches a point near the upper end of the cool storage material container 16.

The cool storage material container 16 is formed by brazing together peripheral edge portions of two generally rectangular aluminum plates 19 (metal plates) which are elongated in the vertical direction, and is filled with a paraffin-based latent heat storage material (thermal storage material which stores cool) having an adjusted freezing point of about 5 to 10° C., such as pentadecane or tetradecane. The aluminum plates 19, which constitute each cool storage material container 16, are each formed, through press work, from an aluminum brazing sheet having a brazing material layer on each of opposite sides thereof. Each of the aluminum plates 19 has bulge portions 19a and 19b, which form the container main body portion 21 and the outward projecting portion 22, respectively, and a rim portion 19c which remains along the peripheral edge and has a predetermined width. The two aluminum plates 19 are assembled together with the inner fin 23 disposed therebetween such that the openings of the bulge portions 19a and 19b face each other. In this state, the rim portions 19c of the two aluminum plates 19 are brazed together, and the inner fin 23 is brazed to the aluminum plates 19, whereby the cool storage material container 16 is formed.

Each outer fin 17 has a fin main body portion 26 and an outward projecting portion 27. The fin main body portion 26 is located rearward of the front side edges of the front heat exchange tubes 13, and is brazed to the front and rear heat exchange tubes 13 of each of the pairs 14 located on opposite sides of the fin main body portion 26. The outward projecting portion 27 extends from the front side edge of the fin main body portion 26 and projects frontward from the front side edges of the front heat exchange tubes 13. Notably, in the heat exchange core section 4, fin pairs 28 each composed of two outer fins 17 disposed in the air-passing clearances 15 adjacent to each other in the left-right direction, and the cool storage material containers 16 are alternately arranged in the left-right direction, and a water retaining clearance 29 for retaining condensed water is provided between the outward projecting portions 27 of the two outer fins 17 of each fin pair 28. A side edge portion (opposite the water retaining clearance 29) of the outward projecting portion 27 of each of the outer fins 17, excluding those at the left and right ends, is brazed to the outward projecting portion 21 of the corresponding cool storage material container 16. Notably, the side edge portion (opposite the water retaining clearance 29) of the outward projecting portion 27 of each outer fins 17 need not be brazed to the outward projecting portion 21 of the corresponding cool storage material container 16, and may be merely in contact with the outward projecting portion 21 of the corresponding cool storage material container 16.

Figure 3:
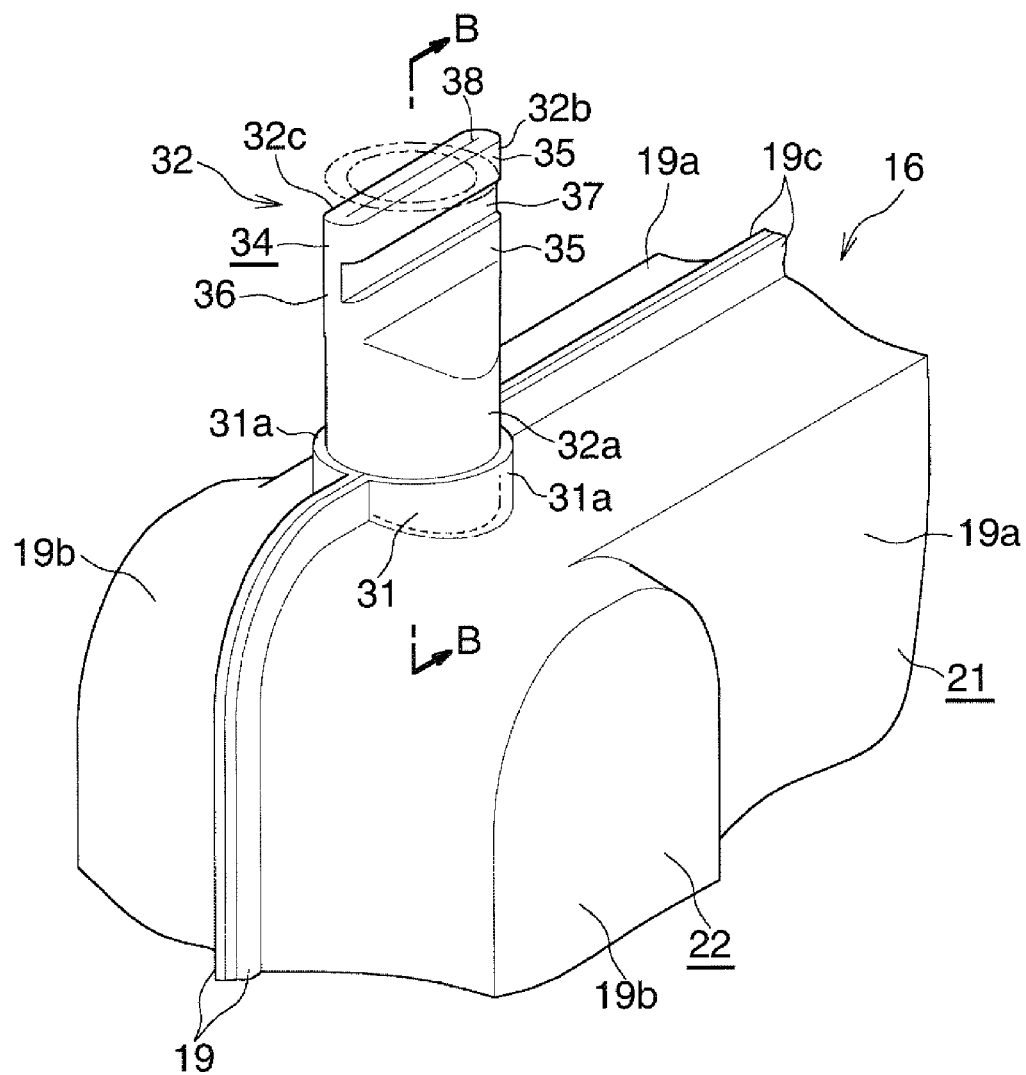
FIG. 3 is an enlarged perspective view showing a main portion of a cool storage material container used in the evaporator with a cool storage function of FIG. 1.
Figure 4:
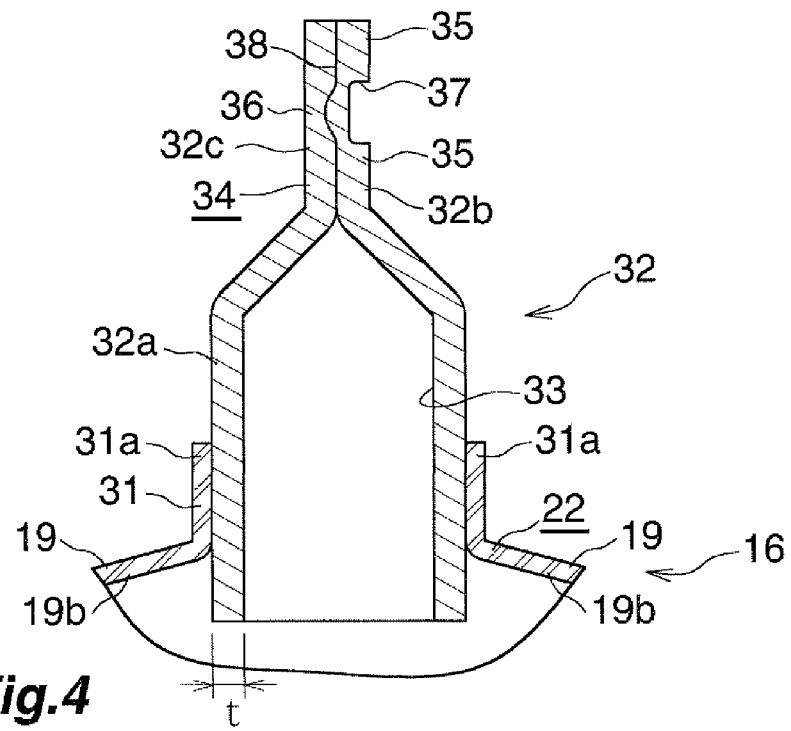
FIG. 4 is an enlarged sectional view taken along line B-B of FIG. 3.

As shown in FIGS. 3 and 4, each cool storage material container 16 has a cylindrical portion 31 which establishes communication between the interior of the cool storage material container 16 and the outside thereof. The cylindrical portion 31 is formed at the upper end of the outward projecting portion 22 of each cool storage material container 16 such that the cylindrical portion 31 extends across the rim portions 19c of the two aluminum plates 19. The cylindrical portion 31 is composed of semi-cylindrical portions 31a formed on the two aluminum plates 19. A portion of a cylindrical cool storage material charging member 32 located near the one end thereof with respect to the longitudinal direction (hereinafter such a portion will be simply referred to as an "end portion") is inserted into the cylindrical portion 31 and is brazed to the cylindrical portion 31. The cool storage material charging member 32 is formed of an aluminum bare material, and the interior of the cool storage material charging member 32 serves as a cool storage material charging passage 33. A portion of the cool storage material charging member 32 projecting from the cylindrical portion 31 is collapsed from opposite sides in the radial direction (from the left and right sides in the present embodiment), whereby the circumferential wall 32a of the cool storage material charging member 32 is deformed. As a result, a collapsed portion 34 is formed on the cool storage material charging member 32, and the cool storage material charging passage 33 is closed and sealed. The collapsed portion 34 of the cool storage material charging member 32 has two first collapsed parts 35 spaced apart from each other in the longitudinal direction of the cool storage material charging member 32, and a second collapsed part 36 which is formed between the two first collapsed parts 35 and which is greater in degree of collapse than the first collapsed parts 35. Each of the two first collapsed parts 35 and the second collapsed part 36 of the cool storage material charging member 32 has a flat shape as viewed on a transverse cross section perpendicular to the longitudinal direction of the cool storage material charging member 32. In each of the two first collapsed parts 35 and the second collapsed part 36 of the cool storage material charging member 32, deformed parts 32b and 32c (portions of the deformed circumferential wall 32a of the cool storage material charging member 32) are in close contact with each other, and a recess 37 having the shape of a rectangular groove is formed on the outer surface of one of the deformed parts 32b and 32c of the second collapsed part 36 (the deformed part on the right hand side in the present embodiment) such that the recess 37 extends in the front-rear direction over the entire width of the second collapsed part 36. As viewed on a vertical cross section taken along the longitudinal direction of the cool storage material charging member 32 and perpendicular to the collapsing direction (see FIG. 4), in the second collapsed part 36, the boundary 38 between the mutually butted deformed parts 32b and 32c is bent, in the second collapsed part 36, toward the deformed part 32c on which the recess 37 is not formed (is bent leftward in the present embodiment).

Figure 5:
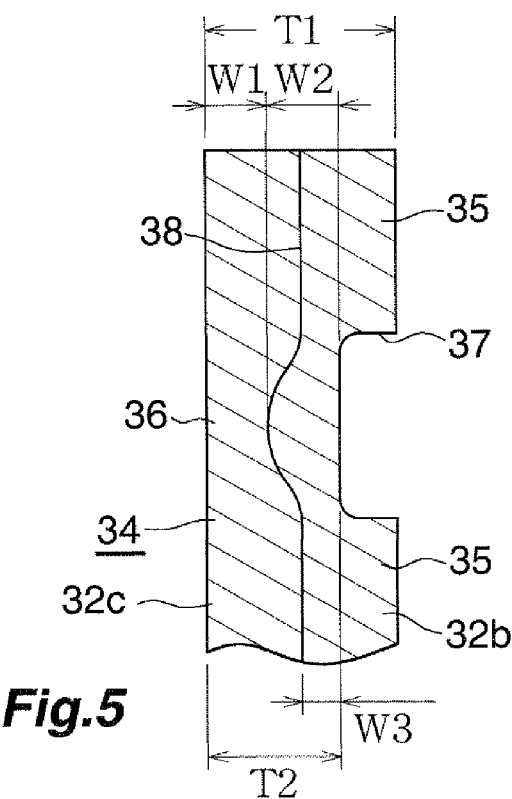
FIG. 5 is a partial enlarged view of FIG. 4.
Figure 6:
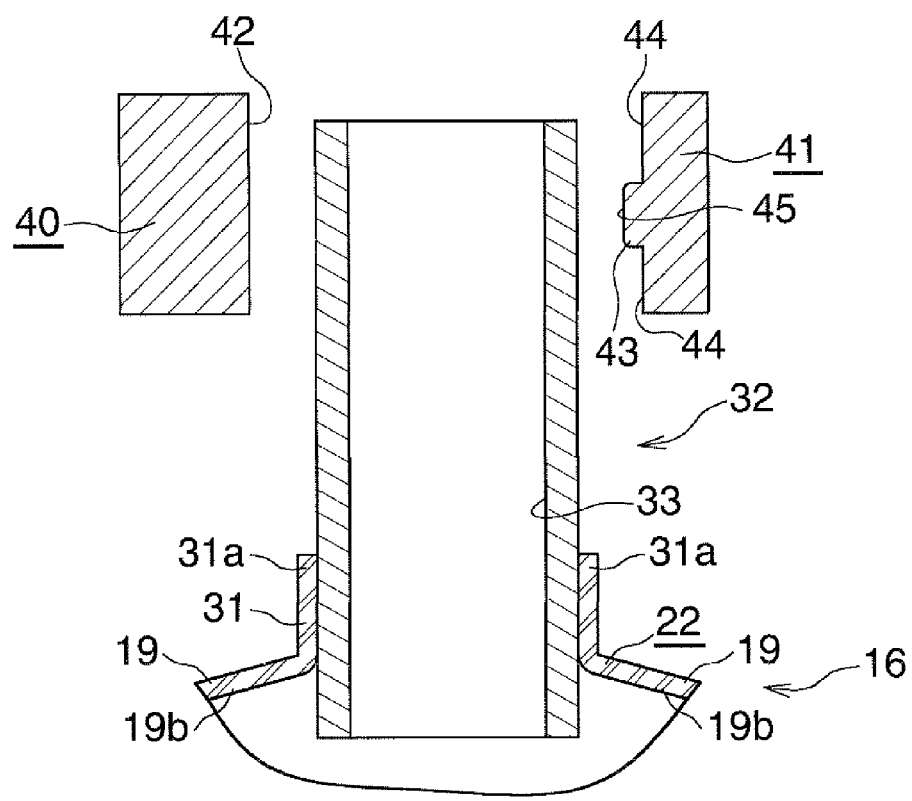
FIG. 6 is a vertical cross-sectional view showing a method of collapsing a cylindrical thermal storage material charging member so as to form a thermal storage material charging member shown in FIG. 3.

As shown in FIGS. 4 and 5, a relation $T2<T1 \leq 2t$ (the double of t) is satisfied, wherein t represents the thickness (mm) of the circumferential wall 32a of an uncollapsed portion of the cool storage material charging member 32, T1 represents the thickness (mm) of the first collapsed parts 35, and T2 represents the thickness (mm) of the second collapsed part 36. Also, preferably, in the second collapsed part 36 of the cool storage material charging member 32, the minimum thickness W1 of the left-side deformed part 32c on which the recess 37 is not formed is smaller than the maximum thickness W2 of the right-side deformed part 32b on which the recess 37 is formed. Moreover, the right-side deformed part 32b of the second collapsed part 36 of the cool storage material charging member 32 has a thickness W3 at opposite ends of the bottom of the recess 37 with respect to the width direction thereof. The thickness W3 is smaller than that at the center of the bottom with respect to the width direction thereof (i.e., the maximum thickness W2 of the deformed part 32b).

The above-described evaporator 1 with a cool storage function constitutes a refrigeration cycle in combination with a compressor driven by an engine of a vehicle, a condenser (refrigerant cooler) for cooling the refrigerant discharged from the compressor, and an expansion valve (pressure-reducing unit) for reducing the pressure of the refrigerant having passed through the condenser. The refrigeration cycle is installed, as a car air conditioner, in a vehicle, such as an automobile, which temporarily stops the engine, which serves as a drive source of the compressor, when the vehicle is stopped. When the compressor is operating, low pressure, two-phase refrigerant (a mixture of vapor refrigerant and liquid refrigerant) having been compressed by the compressor and having passed through the condenser and the expansion valve passes through the refrigerant inlet 7, and enters the leeward upper header section 5 of the evaporator 1. The refrigerant then passes through all the heat exchange tubes 13, and flows out from the refrigerant outlet 8 of the windward upper header section 6. When the refrigerant flows through the heat exchange tubes 13, the refrigerant performs heat exchange with air passing through the air-passing clearances 15, and flows out in a vapor phase.

At that time, the cool storage material within the container main body 21 of each cool storage material container 16 is cooled by the refrigerant flowing through the heat exchange tubes 13. Also, the cool carried by the cooled cool storage material within the container main body 21 is transferred through the inner fin 23 to the cool storage material within the outward projecting portion 22 of the cool storage material container 16. Further, the cool storage material within the outward projecting portion 22 of the cool storage material container 16 is cooled by air having passed through the air-passing clearances 15 and cooled by the refrigerant. As a result, the cool is stored in the entire cool storage material within the cool storage material container 16. At the same time, because of cooling by the refrigerant flowing through the heat exchange tubes 13, condensed water is generated on the surfaces of the outer fins 17. The condensed water flows forward due to the flow of air, and enters the water retaining clearances 29. The condensed water is retained in the water retaining clearances 29 by the capillary force, and cool (sensible heat) is stored in the condensed water. Also, at least a portion of the condensed water retained within the water retaining clearances 29 freezes, whereby cool (sensible heat) is stored.

When the compressor stops, the cool stored in the cool storage material within the container main body portion 21 and outward projecting portion 22 of each cool storage material container 16 is transferred, through the inner fin 23, to the left and right side walls of the container main body portion 21 and the outward projecting portion 22. The cool transferred to the left and right side walls of the container main body portion 21 is transferred to air passing through the air-passing clearances 15, via the corresponding heat exchange tubes 13 and the fin main body portions 26 of the outer fins 17 brazed to the heat exchange tubes 13. The cool transferred to the left and right side walls of the outward projecting portion 22 is transferred, via the outward projection portions 27 of the outer fins 17 brazed to the left and right side surfaces of the outward projecting portion 22, to air passing through the air-passing clearances 15. Also, the cool (sensible heat) stored in the condensed water retained within the water retaining clearances 29 is transferred to the air passing through the air-passing clearances 15 in which the two outer fins 17 of each fin pair 28 are disposed. In the case where the condensed water has frozen within the water retaining clearances 29, the cool (latent heat) of ice and the cool (sensible heat) of condensed water produced as a result of melting of the ice are also transferred to the air passing through the air-passing clearances 15. Accordingly, the cool release time during which cool is released to the air passing through the air-passing clearances 15 can be extended, and even when the temperature of the air having passed through the evaporator 1 increases, the air is cooled, so that a sharp drop in the cooling capacity can be prevented for a relatively long period of time.

Next, a method of manufacturing the above-described evaporator 1 with a cool storage function will be described with reference to FIG. 6.

Components which form the two header tanks 2 and 3, the heat exchange tubes 13, the outer fins 17, the side plates 18, and the inner fins 23 are prepared.

Also, press work is performed on each of the aluminum plates 19, formed from an aluminum brazing sheet having a core material layer and brazing material layers which cover opposite sides of the core material layer, to thereby form the bulge portions 19a and 19b, which form the container main body portion 21 and the outward projecting portion 22, respectively, and the rim portion 19c, which remains along the peripheral edge and has a predetermined width. Simultaneously with this, the semi-cylindrical portions 31a, which form the cylindrical portion 31 for establishing communication between the interior of the cool storage material container 16 and the outside thereof, are provided at portions of the rim portions 19c of the two aluminum plates 19, the portions being continuous with the upper ends of the bulge portions 19b thereof. The two aluminum plates 19 are combined together with the inner fin 23 disposed therebetween such that the openings of the bulge portions 19a and 19b face each other and such that the rim portions 19c overlap each other, whereby the cylindrical portion 31 is formed by the semi-cylindrical portions 31a of the two aluminum plates 19. Thus, each of container forming assemblies is prepared. Also, the cylindrical cool storage material charging member 32 which is formed of an aluminum bare material and whose interior serves as the cool storage material charging passage 33 is prepared.

Subsequently, an end portion of the cool storage material charging member 32 is inserted into the cylindrical portion 31 of each container forming assembly. The container forming assemblies, the components which form the two header tanks 2 and 3, the heat exchange tubes 13, the outer fins 17, and the side plates 18 are assembled together and fixed provisionally. Subsequently, the peripheral edge portions of the two aluminum plates 19 are brazed together, the semi-cylindrical portions 31a are brazed together, the semi-cylindrical portions 31a and the cool storage material charging member 32 are brazed together, and the two aluminum plates 19 and the inner fin 23 are brazed together, whereby each of the cool storage material containers 16 is manufactured. Simultaneously with this, the two aluminum plates 19 and the corresponding heat exchange tubes 13 are brazed together, and the remaining components are brazed together.

Subsequently, a cool storage material is charged into each cool storage material container 16 through the cool storage material charging passage 33 of the cool storage material charging member 32, and a portion of the cool storage material charging member 32 projecting from the cylindrical portion 31 is pressed and collapsed from the opposite sides with respect to the thickness direction of the aluminum plates 19 (i.e., opposite sides in the radial direction) by using a first press die 40 disposed on the left side and a second press die 41 disposed on the right side. Thus, the circumferential wall 32a of the cool storage material charging member 32 is deformed, whereby the collapsed portion 34 is formed on the cool storage material charging member 32, and the cool storage material charging passage 33 is closed and sealed.

The entire right side surface of the first press die 40 forms a flat pressing surface 42. A convex portion 43 having a rectangular transverse cross section is provided on the left side surface of the second press die 41 at an intermediate position with respect to the longitudinal direction thereof such that the convex portion 43 projects leftward. Portions of the left side surface of the second press die 41 located on the upper and lower sides of the convex portion 43 form flat pressing surfaces 44, and the end surface of the convex portion 43 forms a flat pressing surface 45. Accordingly, the two first collapsed parts 35 are formed by the pressing surface 42 of the first press die 40 and the pressing surfaces 44 of the second press die 41 located on the upper and lower sides of the convex portion 43, and the second collapsed part 36 is formed by the pressing surface 42 of the first press die 40 and the pressing surface 45 of the convex portion 43 of the second press die 41. In this manner, the evaporator 1 with a cool storage function is manufactured.

In the above-described embodiment, the first collapsed part 35 located on the distal end side of the second collapsed part 36 may be cut and removed in some cases.

FIGS. 7 to 16 show modifications of the cool storage material charging members and methods of closing the cool storage material charging passages of the cool storage material charging members according to the modifications.

Figure 7:
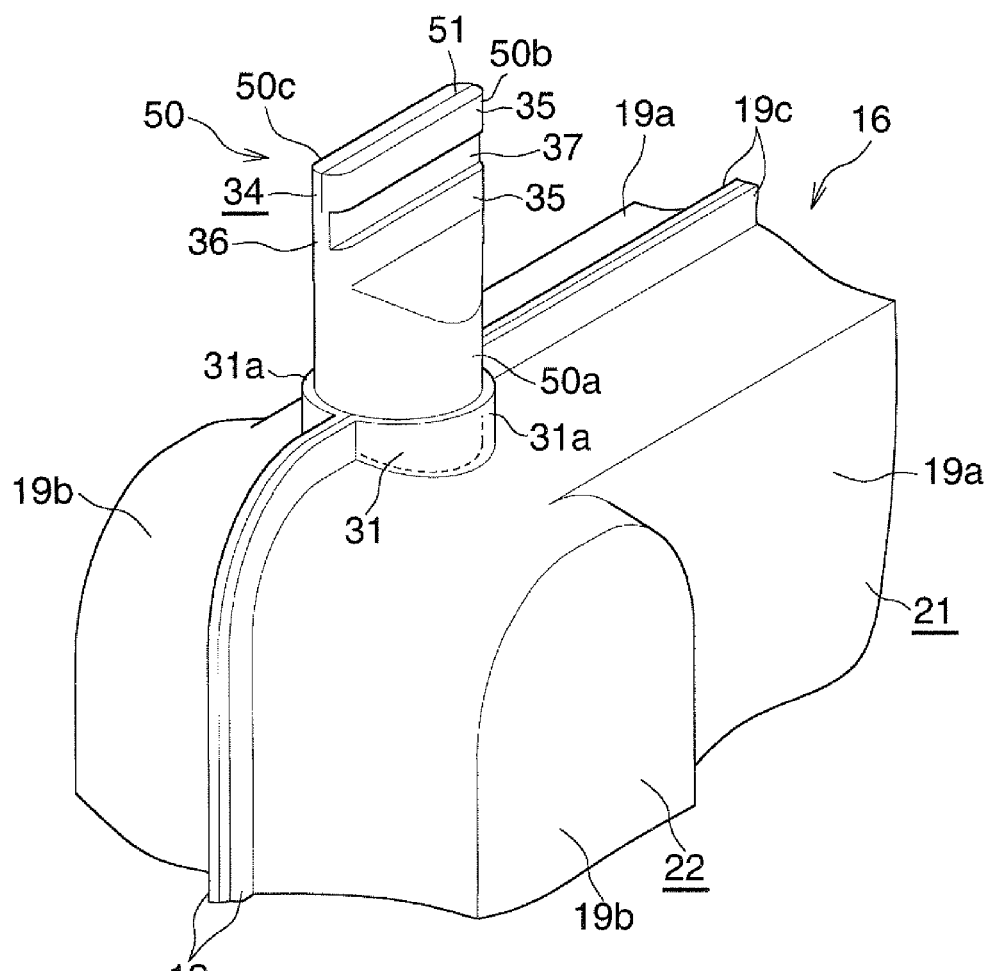
FIG. 7 is a view corresponding to FIG. 3 and showing a first modification of the thermal storage material charging member whose cool storage material charging passage is closed.

In the case of a cool storage material charging member 50 shown in FIG. 7, the first collapsed parts 35 and the second collapsed part 36 of the collapsed portion 34 formed by deforming the circumferential wall 50a of the cool storage material charging member 50 are such that as viewed on a transverse cross section perpendicular to the longitudinal direction of the cool storage material charging member 50, the boundary 51 between mutually butted deformed parts 50b and 50c of the first collapsed part 35 located on the distal end side of the second collapsed part 36 is exposed to the opposite ends of the first collapsed part 35 with respect to the width direction thereof. The structure of the remaining portion is identical to that of the above-described cool storage material charging member 32.

Figure 8:
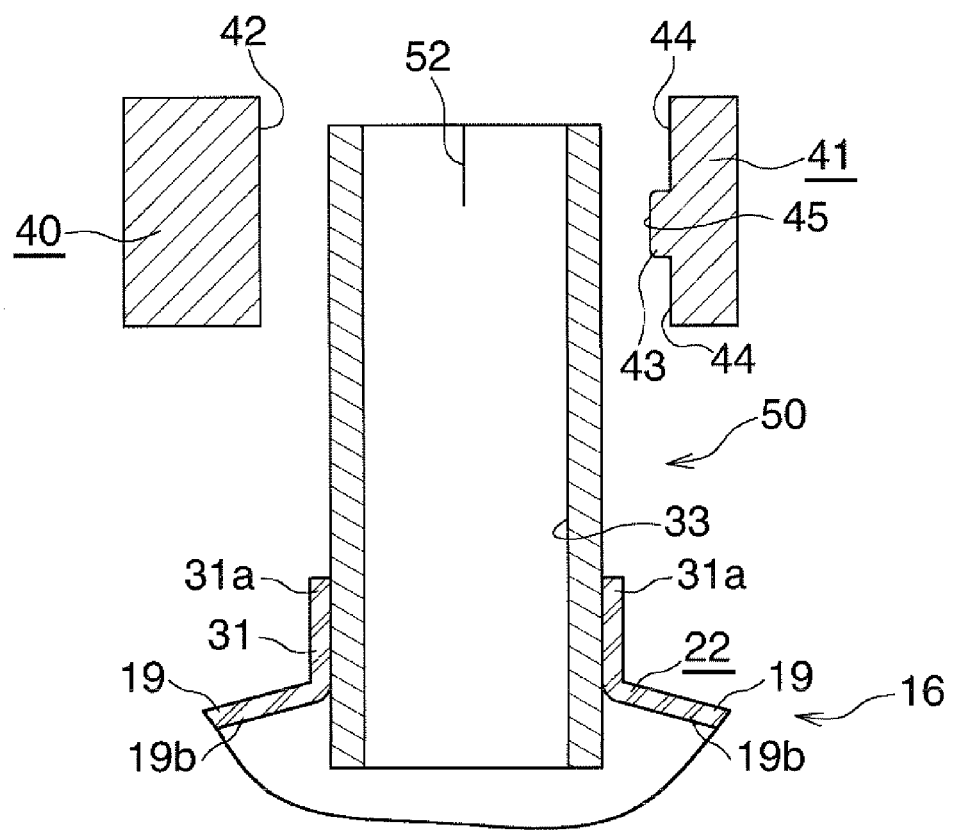
FIG. 8 is a vertical cross-sectional view showing a method of collapsing a cylindrical thermal storage material charging member so as to form the thermal storage material charging member shown in FIG. 7.

A portion of the cool storage material charging member 50 shown in FIG. 7, which portion projects from the cylindrical portion 31, is pressed and collapsed from the opposite sides with respect to the thickness direction of the aluminum plates 19 (i.e., opposite sides in the radial direction) by using a first press die 40 disposed on the left side and a second press die 41 disposed on the right side. Thus, the circumferential wall 32a of the cool storage material charging member 32 is deformed, whereby the collapsed portion 34 is formed on the cool storage material charging member 32, and the cool storage material charging passage 33 is closed and sealed. At that time, as shown in FIG. 8, slits 52 are formed in the circumferential wall 50a of the cool storage material charging member 50 at positions on a single diametrical line such that the slits 52 extend from the distal end to a region where the second collapsed part 36 is to be formed.

Figure 9:
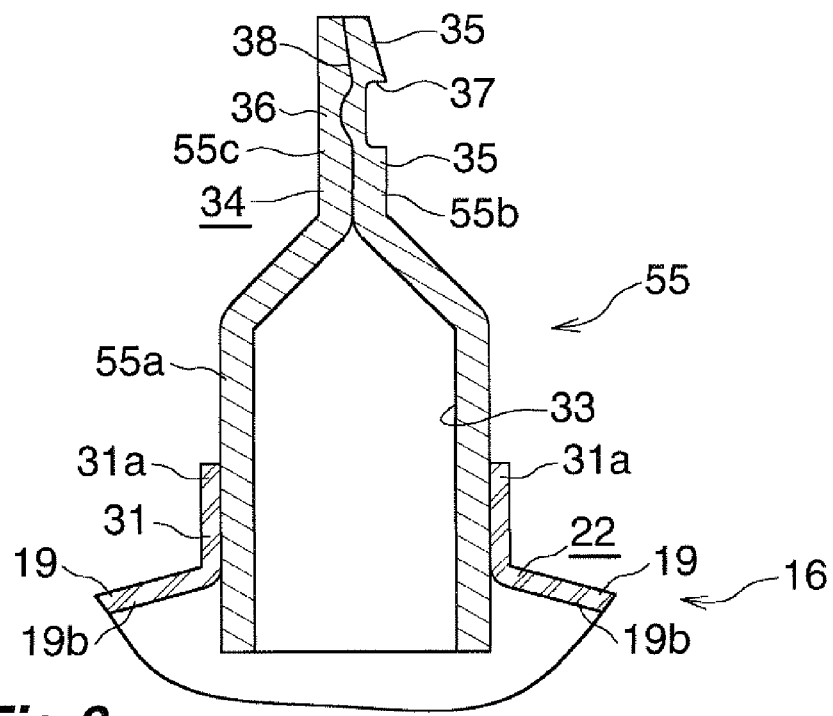
FIG. 9 is a view corresponding to FIG. 4 and showing a second modification of the thermal storage material charging member whose cool storage material charging passage is closed.

In the case of a cool storage material charging member 55 shown in FIG. 9, the circumferential wall 55a of the cool storage material charging member 55 is deformed such that one of mutually butted deformed parts 55b and 55c of the first collapsed part 35 of the collapsed portion 34 located on the distal end side of the second collapsed part 36 thereof (the right-side deformed parts 55b in the present modification) decreases in thickness toward the distal end, whereby the outer surface of the right-side deformed part 55b slopes leftward toward the upper end thereof. The structure of the remaining portion is identical to that of the above-described cool storage material charging member 32.

Figure 10:
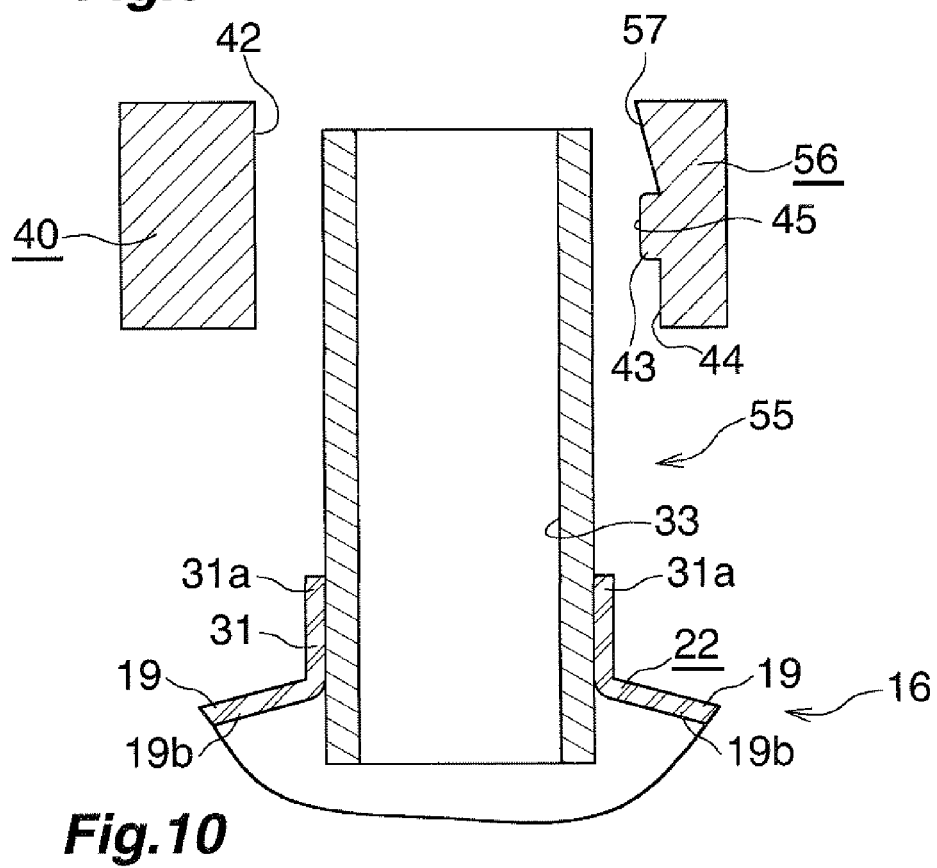
FIG. 10 is a vertical cross-sectional view showing a method of collapsing a cylindrical thermal storage material charging member so as to form the thermal storage material charging member shown in FIG. 9.

As shown in FIG. 10, a second press die 56, which is used in combination with the first press die 40 in order to press and collapse a portion of the cool storage material charging member 55 shown in FIG. 9 projecting from the cylindrical portion 31, from the opposite sides with respect to the thickness direction of the aluminum plates 19 (i.e., opposite sides in the radial direction), is formed such that a pressing surface 57 (left side surface) of the second press die 56, which is located on the upper side of the convex portion 43, slopes leftward toward the upper end thereof. Accordingly, the two first collapsed parts 35 are formed by the pressing surface 42 of the first press die 40 and the pressing surfaces 57 and 44 of the second press die 56 located on the upper and lower sides of the convex portion 43, and the second collapsed part 36 is formed by the pressing surface 42 of the first press die 40 and the pressing surface 45 of the convex portion 43 of the second press die 56. At that time, the upper-side pressing surface 57 of the second press die 56 forms the deformed part 55b such that its thickness decreases toward the distal end thereof and its outer surface slopes leftward toward the upper end thereof.

Figure 11:
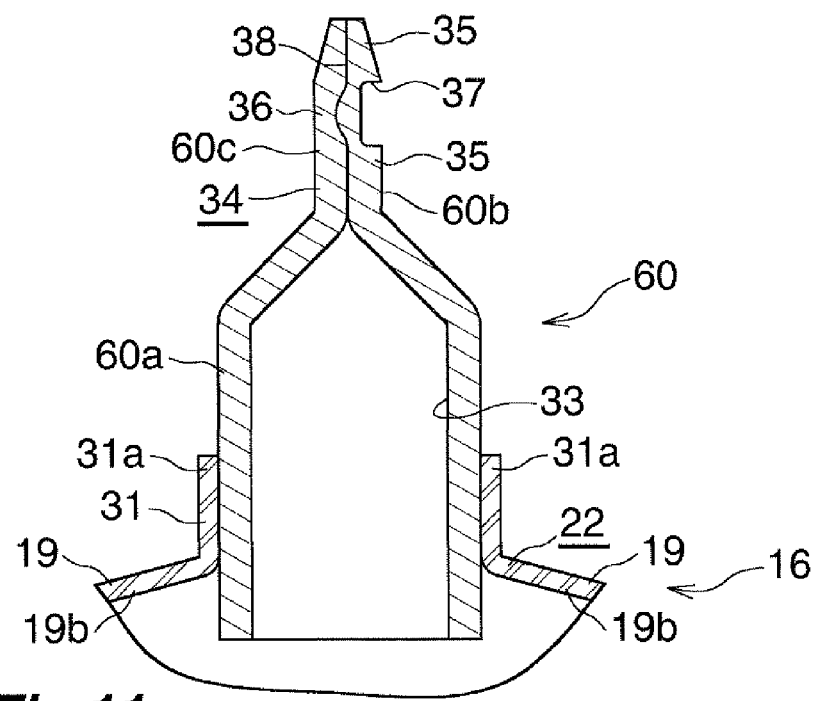
FIG. 11 is a view corresponding to FIG. 4 and showing a third modification of the thermal storage material charging member whose cool storage material charging passage is closed.

In the case of a cool storage material charging member 60 shown in FIG. 11, the circumferential wall 60a of the cool storage material charging member 60 is deformed such that both of mutually butted deformed parts 60b and 60c of the first collapsed part 35 of the collapsed portion 34 located on the distal end side of the second collapsed part 36 thereof decrease in thickness toward the distal end, whereby the outer surface of the right-side deformed part 60b slopes leftward toward the upper end thereof, and the outer surface of the left-side deformed part 60c slopes rightward toward the upper end thereof. The structure of the remaining portion is identical to that of the above-described cool storage material charging member 32.

Figure 12:
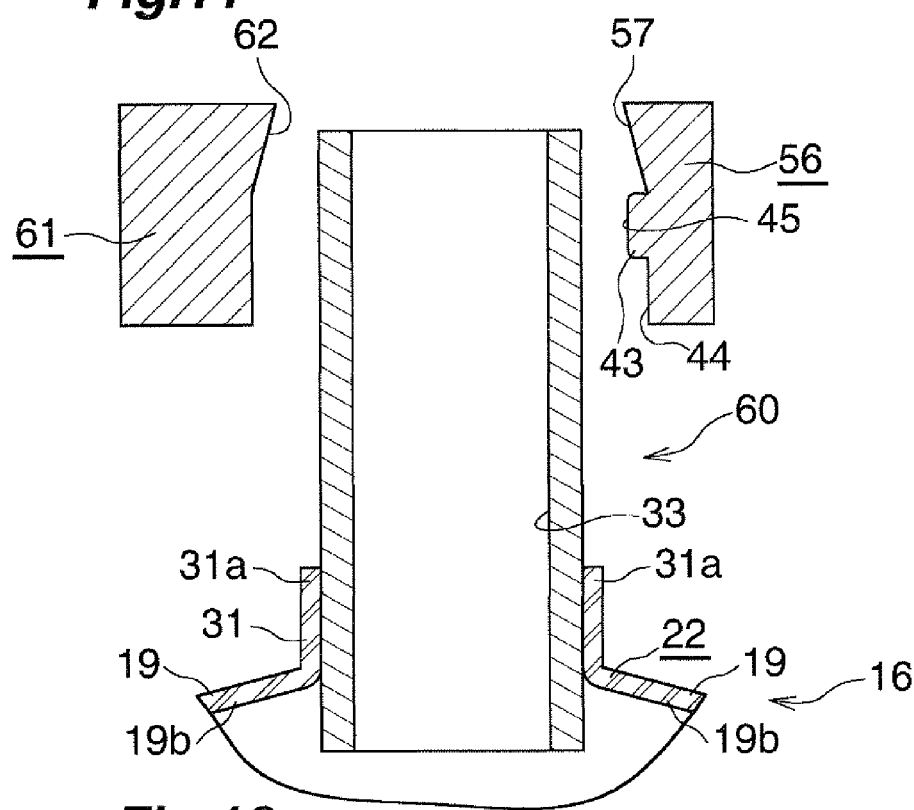
FIG. 12 is a vertical cross-sectional view showing a method of collapsing a cylindrical thermal storage material charging member so as to form the thermal storage material charging member shown in FIG. 11.

As shown in FIG. 12, a first press die 61, which is used in combination with the second press die 56 in order to press and collapse a portion of the cool storage material charging member 60 shown in FIG. 11 projecting from the cylindrical portion 31, from the opposite sides with respect to the thickness direction of the aluminum plates 19 (i.e., opposite sides in the radial direction), is formed such that a portion of a pressing surface 62 (right side surface) of the first press die 61, which portion corresponds to the pressing surface 57 of the second press die 56 located on the upper side of the convex portion 43, slopes rightward toward the upper end thereof. Accordingly, the two first collapsed parts 35 are formed by the pressing surface 62 of the first press die 61 and the pressing surfaces 57 and 44 of the second press die 56 located on the upper and lower sides of the convex portion 43, and the second collapsed part 36 is formed by the pressing surface 62 of the first press die 61 and the pressing surface 45 of the convex portion 43 of the second press die 56. At that time, the upper-side pressing surface 57 of the second press die 56 forms the deformed part 60b such that its thickness decreases toward the distal end thereof and its outer surface slopes leftward toward the upper end thereof, and the upper portion of the pressing surface 62 of the first press die 61 forms the deformed part 60c such that its thickness decreases toward the distal end thereof and its outer surface slopes rightward toward the upper end thereof.

Figure 13:
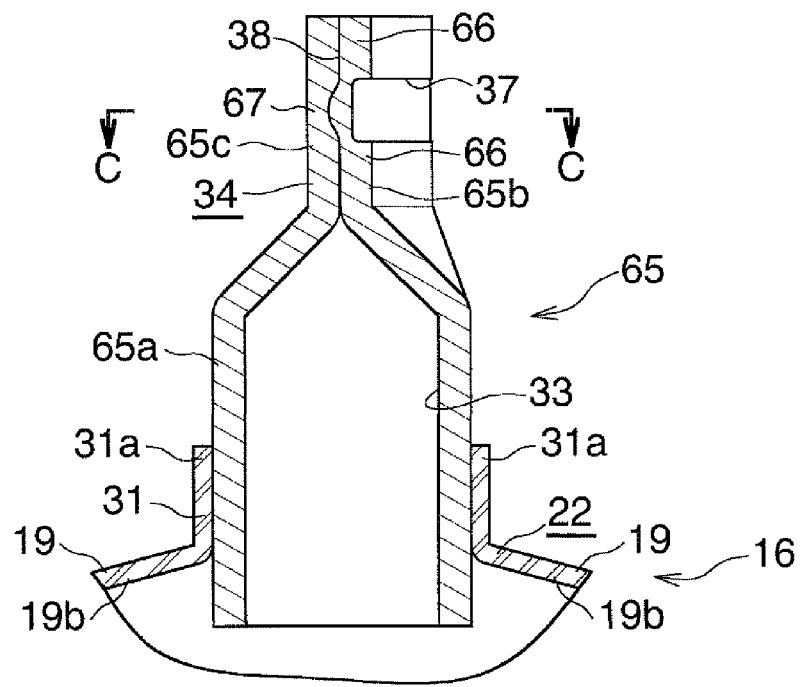
FIG. 13 is a view corresponding to FIG. 4 and showing a fourth modification of the thermal storage material charging member whose cool storage material charging passage is closed.
Figure 14:
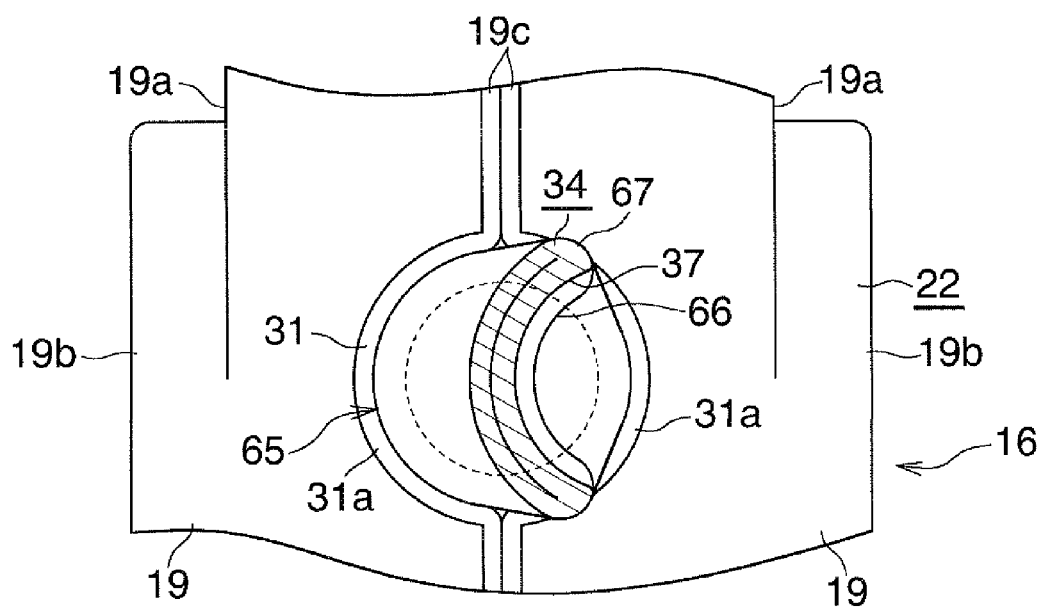
FIG. 14 is a sectional view taken along line C-C of FIG. 13.

In the case of a cool storage material charging member 65 shown in FIGS. 13 and 14, first collapsed parts 66 and a second collapsed part 67 of the collapsed portion 34 formed by deforming the circumferential wall 65a of the cool storage material charging member 65 are such that as viewed on a transverse cross section perpendicular to the longitudinal direction of the cool storage material charging member 65, each of the first collapsed parts 66 and the second collapsed part 67 has a U-like shape. The structure of the remaining portion is identical to that of the above-described cool storage material charging member 32.

Figure 15:
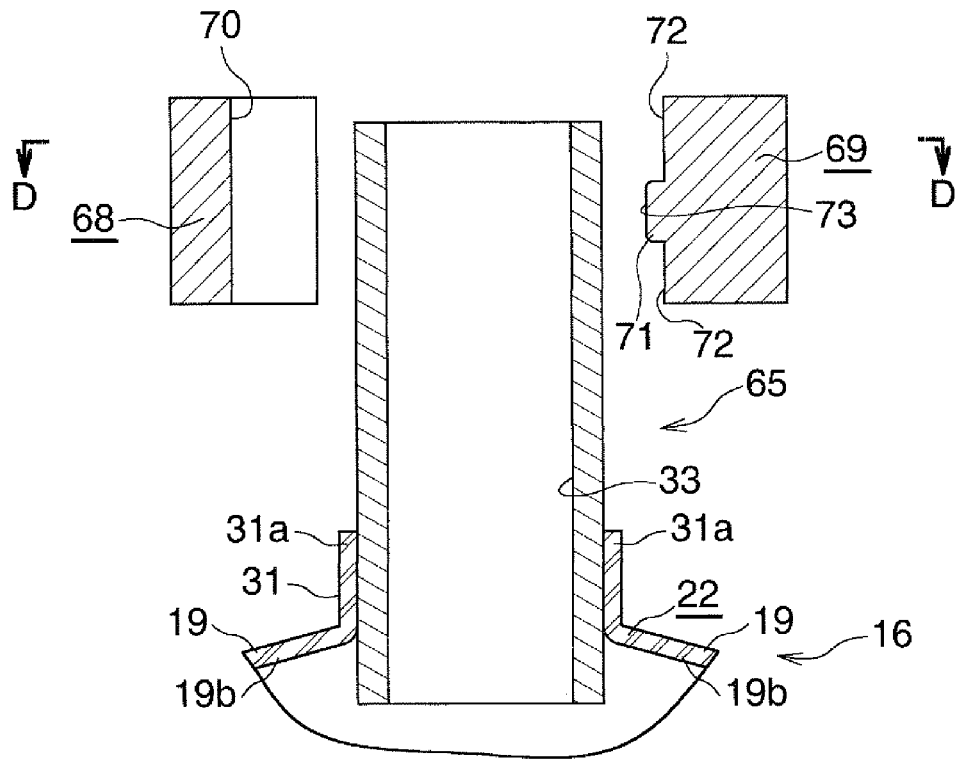
FIG. 15 is a vertical cross-sectional view showing a method of collapsing a cylindrical thermal storage material charging member so as to form the thermal storage material charging member shown in FIGS. 13 and 14.
Figure 16:
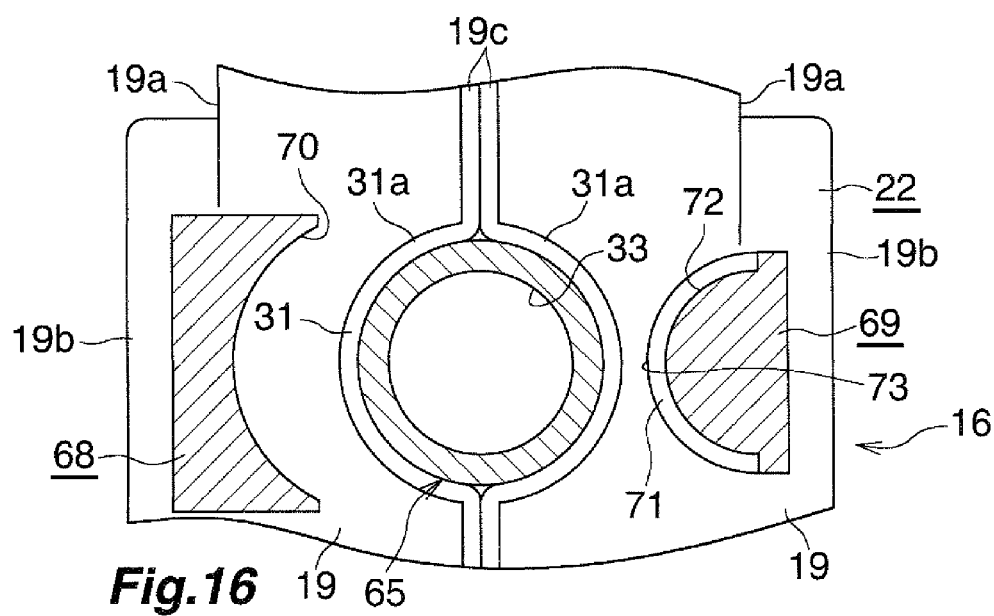
FIG. 16 is a sectional view taken along line D-D of FIG. 15.

As shown in FIGS. 15 and 16, a portion of the cool storage material charging member 65 shown in FIGS. 13 and 14, which portion projects from the cylindrical portion 31, is pressed and collapsed from the opposite sides with respect to the thickness direction of the aluminum plates 19 (i.e., opposite sides in the radial direction) by using a first press die 68 disposed on the left side and a second press die 69 disposed on the right side. The entire right-side surface of the first press die 68 forms a pressing surface 70 which has a concave arcuate shape as viewed on a horizontal transverse cross section thereof and which has a uniform radius of curvature across the entire surface. A convex portion 71 having a rectangular transverse cross section projects leftward from an intermediate portion of the left side surface of the second press die 69 with respect to the longitudinal direction. Portions of the left side surface located on the upper and lower sides of the convex portion 71 form pressing surfaces 72 each of which has a convex arcuate shape as viewed on a horizontal transverse cross section thereof and which has a uniform radius of curvature across the entire surface, and the end surface of the convex portion 71 forms a pressing surface 73 which has a convex arcuate shape as viewed on a horizongal transverse cross section thereof and which has a unfirml radius of curvature across the entire surface. The radius of curvature of the pressing surface 73 of the convex portion 71 of the second press die 69 as viewed on a transverse cross section thereof is rendered larger than the radius of curvature of the pressing surfaces 72 located on the upper and lowers side of the convex portion 71 as viewed on a transverse cross section thereof. Accordingly, the two first collapsed parts 66 are formed by the pressing surface 70 of the first press die 68 and the pressing surfaces 72 of the second press die 69 located on the upper and lower sides of the convex portion 71, and the second collapsed part 67 is formed by the pressing surface 70 of the first press die 68 and the pressing surface 73 of the convex portion 71 of the second press die 69.

In the case of the cool storage material charging members 55, 60, and 65 shown in FIGS. 9 to 16 as well, as viewed on a transverse cross section perpendicular to the longitudinal direction of the cool storage material charging member 55 (60, 65), which includes the first collapsed parts 35 (66) and the second collapsed part 36 (67), the boundary 38 between the mutually butted deformed parts 55b and 55c (60b and 60c, 65b and 65c) of the first collapsed part 35 (66) located on the distal end side of the second collapsed part 36 (67) may be exposed to the opposite ends of the first collapsed part 35 (66) with respect to the width direction thereof. In this case, before collapsing the cool storage material charging member 55 (60, 65), slits are formed in the circumferential wall 55a (60a, 65a) at positions on a single diametrical line such that the slits extend from the distal end to a region where the second collapsed part 36 (67) is to be formed.

In the above-described embodiment, the heat exchanger with a thermal storage function according to the embodiment is used as an evaporator with a cool storage function. However, the present invention is not limited thereto, and may be used as a heat exchanger with a heat storage function which includes a plurality of heat exchange tubes through which a medium for conveying heat flows and thermal storage material containers filled with a thermal storage material for storing heat.

The method of manufacturing the heat exchanger with a thermal storage function according to the embodiment includes the following modes.

(a) The method of manufacturing a heat exchanger with a thermal storage function according to claim 16 is such that in the first and second collapsed parts of the collapsed portion of the thermal storage material charging member, deformed parts, which are portions of the deformed circumferential wall of the thermal storage material charging member, are brought into close contact with each other, and a recess is formed on the outer surface of one of the two deformed parts of the second collapsed part which are in close contact with each other such that the recess extends over the entire width of the second collapsed part.

(b) The method of manufacturing the heat exchanger with a thermal storage function of the above-described paragraph (a) is such that as viewed on a vertical cross section which extends along the longitudinal direction of the thermal storage material charging member and perpendicular to the collapsing direction, the boundary between the mutually butted deformed parts is bent, in the second collapsed part, toward the deformed part on which the recess is not formed.

(c) The method of manufacturing the heat exchanger with a thermal storage function of the above-described paragraph (a) is such that in the second collapsed part of the thermal storage material charging member, the minimum thickness of the deformed part on which the recess is not formed is rendered smaller than the maximum thickness of the deformed part on which the recess is formed.

(d) The method of manufacturing the heat exchanger with a thermal storage function of the above-described paragraph (a) is such that in the second collapsed part of the thermal storage material charging member, the recess formed on one deformed part has the shape of a rectangular groove, and the thickness of the deformed part at opposite ends of the bottom of the recess is rendered smaller than that at a central portion of the bottom with respect to the width direction thereof.

1) A heat exchanger with a thermal storage function which comprises a plurality of heat exchange tubes and a plurality of thermal storage material containers made of metal and filled with a thermal storage material and which is configured such that heat of a medium which flows through the heat exchange tubes and conveys heat is transferred to the thermal storage material within the thermal storage material containers, wherein each thermal storage material container has a cylindrical portion which is formed at a peripheral edge portion of the thermal storage material container so as to establish communication between the interior and exterior of the thermal storage material container; an end portion of a cylindrical thermal storage material charging member of metal whose interior serves as a thermal storage material charging passage and whose inner circumferential surface is formed by a metal bare material is inserted into the cylindrical portion and is brazed thereto; a portion of the thermal storage material charging member projecting from the cylindrical portion is collapsed from opposite sides in a radial direction, whereby the circumferential wall of the thermal storage material charging member is deformed such that a collapsed portion is formed on the thermal storage material charging member and the thermal storage material charging passage is closed and sealed; the collapsed portion of the thermal storage material charging member has a first collapsed part and a second collapsed part which is formed adjacent to the first collapsed part in a longitudinal direction of the thermal storage material charging member and which is greater in degree of collapse than the first collapsed part; and a relation T2<T1≤2t is satisfied, where t represents a thickness of the circumferential wall of an uncollapsed portion of the thermal storage material charging member, T1 represents a thickness of the first collapsed part, and T2 represents a thickness of the second collapsed part.

2) A heat exchanger with a thermal storage function according to par. 1), wherein each thermal storage material container is formed by brazing together peripheral edge portions of two metal plates each formed form a brazing sheet, the cylindrical portion is formed between the peripheral edge portions of the two metal plates of the thermal storage material container, and the entire thermal storage material charging member is formed of the metal bare material.

3) A heat exchanger with a thermal storage function according to par. 1), wherein in each of the first and second collapsed parts of the collapsed portion of the thermal storage material container, two deformed parts which are portions of the deformed circumferential wall of the thermal storage material charging member are in close contact with each other, and a recess is formed on one of the two deformed parts such that the recess extends over the entire width of the second collapsed part.

4) A heat exchanger with a thermal storage function according to par. 3), wherein as viewed on a transverse cross section which extends along the longitudinal direction of the thermal storage material charging member and perpendicular to a collapsing direction, the boundary between the two deformed parts brought into close contact with each other is bent, in the second collapsed part, toward the deformed part on which the recess is not formed.

5) A heat exchanger with a thermal storage function according to par. 3), wherein in the second collapsed part of the thermal storage material charging member, the minimum thickness of the deformed part on which the recess is not formed is smaller than the maximum thickness of the deformed part on which the recess is formed.

6) A heat exchanger with a thermal storage function according to par. 3), wherein in the second collapsed part of the thermal storage material charging member, the recess formed on one deformed part has the shape of a rectangular groove, and the thickness of the deformed part at opposite ends of the bottom of the recess with respect to the width direction thereof is rendered smaller than that at a central portion of the bottom with respect to the width direction.

7) A heat exchanger with a thermal storage function according to par. 1), wherein the first collapsed part is provided on the distal end side of the second collapsed part, and in the first collapsed part provided on the distal end side of the second collapsed part, one of the two deformed parts decreases in thickness toward the distal end thereof.

8) A heat exchanger with a thermal storage function according to par. 1), wherein the first collapsed part is provided on the distal end side of the second collapsed part, and in the first collapsed part provided on the distal end side of the second collapsed part, both of the two deformed parts decrease in thickness toward the distal ends thereof.

9) A heat exchanger with a thermal storage function according to par. 1), wherein each of the first and second collapsed parts of the thermal storage material charging member has a flat shape as viewed on a transverse cross section perpendicular to the longitudinal direction of the thermal storage material charging member.

10) A heat exchanger with a thermal storage function according to par. 1), wherein each of the first and second collapsed parts of the thermal storage material charging member has a U-like shape as viewed on a transverse cross section perpendicular to the longitudinal direction of the thermal storage material charging member.

11) A heat exchanger with a thermal storage function according to par. 1), wherein the boundary between the mutually butted deformed parts of the first collapsed part located on the distal end side of the second collapsed part is exposed to the opposite ends of the first collapsed part with respect to the width direction thereof as viewed on a transverse cross section perpendicular to the longitudinal direction of the thermal storage material charging member.

12) A heat exchanger with a thermal storage function according to par. 1), wherein the collapsed portion of each thermal storage material charging member has two first collapsed parts formed apart from each other in the longitudinal direction of the thermal storage material charging member, and a second collapsed part formed between the two first collapsed parts.

13) A heat exchanger with a thermal storage function according to par. 1), wherein the heat exchange tubes are flat tubes disposed such that their width direction coincides with an air-passing direction, the heat exchange tubes are disposed in parallel such that the heat exchange tube are spaced apart from one another, air-passing clearances are formed between adjacent heat exchange tubes, the thermal storage material containers are flat containers extending in the vertical direction and disposed such that their width direction coincides with the air-passing direction, and the thermal storage material containers are disposed in some of the air-passing clearances.

14) A heat exchanger with a thermal storage function according to par. 13), which is configured such that a medium for conveying cool flows through the heat exchange tubes, a thermal storage material for storing cool is charged into the thermal storage material containers, and the thermal storage material within the thermal storage material containers is cooled by cool of the medium flowing through the heat exchange tubes, and which is used as an evaporator with a thermal storage function.

15) A heat exchanger with a thermal storage function according to par. 13), which is configured such that a medium for conveying heat flows through the heat exchange tubes, a thermal storage material for storing heat is charged into the thermal storage material containers, and the thermal storage material within the thermal storage material containers is heated by heat of the medium flowing through the heat exchange tubes.

16) A method of manufacturing the heat exchanger with a thermal storage function according to par. 1), comprising:
preparing a plurality of heat exchange tubes and a plurality of thermal storage material containers each having a cylindrical portion which establishes communication between the interior and exterior thereof;
inserting into the cylindrical portion of each thermal storage material container an end portion of a cylindrical thermal storage material charging member of metal whose interior serves as a thermal storage material charging passage and whose inner circumferential surface is formed by a metal bare material;
brazing the thermal storage material charging member to the cylindrical portion of each thermal storage material container and brazing the heat exchange tubes and the thermal storage material containers together;
charging a thermal storage material into each thermal storage material container through the thermal storage material charging member thereof;
preparing a first press die having a single pressing surface extending over the entirety of the first press die, and a second press die having a convex portion at an intermediate position with respect to the longitudinal direction and configured such that an end surface of the convex portion and surfaces of the second press die located on the upper and lower sides of the convex portion serve as pressing surfaces;
collapsing a portion of the thermal storage material charging member projecting from the cylindrical portion from opposite sides in a radial direction by the pressing surfaces of the two press dies so as to deform the circumferential wall of the thermal storage material charging member such that a deformed part is formed on the thermal storage material charging member and the thermal storage material charging passage is closed and sealed, the collapsed portion of the thermal storage material charging member having a first collapsed part and a second collapsed part which is formed adjacent to the first collapsed part in a longitudinal direction of the thermal storage material charging member and which is greater in degree of collapse than the first collapsed part, wherein a relation T2<T1≤2t is satisfied, where t represents a thickness of the circumferential wall of an uncollapsed portion of the thermal storage material charging member, T1 represents a thickness of the first collapsed part, and T2 represents a thickness of the second collapsed part.

17) A manufacturing method according to par. 16), further comprising:

performing press work on two metal plates each formed from a brazing sheet having a core material layer and brazing material layers covering opposite sides of the core material layer so as to form an outward bulging portion at a portion of at least one metal plate excluding a peripheral edge portion thereof, and provide semi-cylindrical portions at the peripheral edge portions of the two metal plates, the semi-cylindrical portions forming the cylindrical portion for establishing communication between the interior and exterior of the thermal storage material container;

combining the two metal plates such that an opening of the outward bulging portion of the at least one metal plate faces the other metal plate and the cylindrical portion is formed by the semi-cylindrical portions of the two metal plates, whereby each of a plurality of container forming assemblies are prepared;

inserting into the cylindrical portion of each container forming assembly an end portion of a cylindrical thermal storage material charging member whose interior serves as a thermal storage material charging passage and which is formed of a metal bare material; and brazing the peripheral edge portions of the metal plates together so as to manufacture each thermal storage material container having the cylindrical portion, brazing the thermal storage material charging member to the cylindrical portion of each thermal storage material container, and brazing the heat exchange tubes and the thermal storage material containers together.

18) A manufacturing method according to par. 16), wherein the pressing surface of the second press die located on the distal end side of the convex portion is a sloping surface which slopes toward the first press die such that the spacing between the two dies decreases toward the distal end of the sloping surface, whereby in the first collapsed part located on the distal end side of the second collapsed part, one of the deformed parts is formed such that its thickness decreases toward the distal end thereof.

19) A manufacturing method according to par. 16), wherein an upper portion of the pressing surface of the first press die and the pressing surface of the second press die located on the distal end side of the convex portion are sloping surfaces which slopes toward each other such that the spacing between the two dies decreases toward the distal ends of the sloping surfaces, whereby in the first collapsed part located on the distal end side of the second collapsed part, both of the deformed parts are formed such that their thicknesses decrease toward the distal ends thereof.

20) A manufacturing method according to par. 16), wherein the pressing surface of the first press die and all the pressing surfaces of the second press die are made flat.

21) A manufacturing method according to par. 16), wherein the pressing surface of the first press die is formed to have a concave arcuate shape as viewed on a transverse cross section thereof, and each of all the pressing surfaces of the second press die is formed to have a convex arcuate shape as viewed on a transverse cross section thereof, and the radius of curvature of the transverse-cross-sectional shape of the pressing surface of the convex portion of the second press die is made larger than the radius of curvature of the transverse-cross-sectional shape of the pressing surfaces on the opposite sides of the convex portion.

22) A manufacturing method according to par. 16), wherein slits are formed in the circumferential wall of the thermal storage material charging member at positions on a single diametrical line such that the slits extend from the distal end of the thermal storage material charging member to a region where the second collapsed part is to be formed.

In a heat exchanger with a thermal storage function according to any one of pars. 1) to 15), a cylindrical portion for establishing communication between the interior and exterior of each thermal storage material container is formed between peripheral edge portions of two metal plates of the thermal storage material container; an end portion of a cylindrical thermal storage material charging member of metal whose interior serves as a thermal storage material charging passage and which is formed of a metal bare material is inserted into the cylindrical portion and is brazed thereto; a portion of the thermal storage material charging member projecting from the cylindrical portion is collapsed from opposite sides in a radial direction, whereby the circumferential wall of the thermal storage material charging member is deformed such that a collapsed portion is formed on the thermal storage material charging member and the thermal storage material charging passage is closed and sealed; the collapsed portion of the thermal storage material charging member has a first collapsed part and a second collapsed part which is formed adjacent to the first collapsed part in a longitudinal direction of the thermal storage material charging member and which is greater in degree of collapse than the first collapsed part; and a relation T2<T1≤2t is satisfied, where t represents the thickness of the circumferential wall of an uncollapsed portion of the thermal storage material charging member, T1 represents the thickness of the first collapsed part, and T2 represents the thickness of the second collapsed part. Therefore, as compared with a case where a circular columnar plug is merely press-fitted into the cylindrical portion, leakage of the thermal storage material charged into each thermal storage material container can be prevented reliably. Also, such a plug, which is a separate member, is unnecessary. In addition, leakage of the thermal storage material from each thermal storage material container can be prevented without sealing the distal end of the thermal storage material charging member by means of welding, bonding, or the like.

According to a heat exchanger with a thermal storage function according to any one of pars. 3) to 12), in the first and second collapsed parts of the collapsed portion of the thermal storage material charging member, the degree of close contact between the deformed parts, which are portions of the deformed circumferential wall of the thermal storage material charging member, increases, whereby leakage of the thermal storage material charged into each thermal storage material container can be prevented more effectively. In particular, since the material stretches as a result of deformation of the circumferential wall of the thermal storage material charging member, the oxide film on the surface may be broken, and a new metal surface may appear. Therefore, the deformed parts which have been brought into close contact with each other are pressure-bonded together at least partially, whereby the degree of close contact between the deformed parts, which are portions of the deformed circumferential wall of the thermal storage material charging member, increases.

According to a manufacturing method according to any one of pars. 16) to 22), leakage of the thermal storage material charged into the thermal storage material containers of a manufactured heat exchanger with a thermal storage function can be prevented reliably.

According to a manufacturing method according to any one of pars. 18) to 22), in the first and second collapsed parts of the collapsed portion of the thermal storage material charging member of a manufactured heat exchanger with a thermal storage function, the degree of close contact between the deformed parts, which are portions of the deformed circumferential wall of the thermal storage material charging member, increases, whereby leakage of the thermal storage material charged into each thermal storage material container can be prevented more effectively. In particular, since the material stretches as a result of deformation of the circumferential wall of the thermal storage material charging member, the oxide film on the surface may be broken, and a new metal surface may appear. Therefore, the deformed parts which have been brought into close contact with each other are pressure-bonded together at least partially, whereby the degree of close contact between the deformed parts, which are portions of the deformed circumferential wall of the thermal storage material charging member, increases.

Obviously, numerous modifications and variations of the present invention are possible in light of the above teachings. It is therefore to be understood that within the scope of the appended claims, the invention may be practiced otherwise than as specifically described herein.

What is claimed is:

1. A heat exchanger with a thermal storage function, comprising:
   a plurality of heat exchange tubes through which a medium is to flow;
   a plurality of thermal storage material containers in which a thermal storage material is provided, each of the thermal storage material containers being made of metal and provided such that heat of the medium which flows through the heat exchange tubes is transferred to the thermal storage material within each of the thermal storage material containers, each of the thermal storage material containers including a peripheral edge portion and a cylindrical portion provided at the peripheral edge portion to establish communication between an interior and an exterior of each of the thermal storage material containers; and
   a first thermal storage material charging member having a cylindrical shape extending along a longitudinal axis thereof, the first thermal storage material charging member being made of metal and including a thermal storage material charging passage and an inner circumferential surface formed by a metal bare material, the first thermal storage material charging member including a first end and a second end opposite to the first end, the first end being provided in and brazed to the cylindrical portion of one of the thermal storage material containers, the second end projecting from the cylindrical portion and being collapsed from opposite sides in a radial direction of the first thermal storage material charging member, a circumferential wall of the first thermal storage material charging member being deformed such that a collapsed portion is formed on the first thermal storage material charging member and the thermal storage material charging passage is closed and sealed, the collapsed portion of the first thermal storage material charging member including a first collapsed part and a second collapsed part which is adjacent to the first collapsed part in a longitudinal direction of the first thermal storage material charging member and which is greater in degree of collapse than the first collapsed part, a relation $T2<T1<2t$ being satisfied where "t" represents a thickness of the circumferential wall of an uncollapsed portion of the first thermal storage material charging member, "T1" represents a thickness of the first collapsed part, and "T2" represents a thickness of the second collapsed part,
   wherein, in both the first collapsed part and the second collapsed part, the opposite sides of the first thermal storage material charging member are in contact with each other,
   wherein the first collapsed part and the second collapsed part extend laterally with respect to the longitudinal axis of the first thermal storage material charging member, and
   wherein the first collapsed part and the second collapsed part extend laterally across an entire width of the first thermal storage material charging member.

2. The heat exchanger with the thermal storage function according to claim 1, wherein each of the thermal storage material containers is formed by brazing together peripheral edge portions of two metal plates each formed from a brazing sheet, the cylindrical portion is formed between the peripheral edge portions of the two metal plates of each of the thermal storage material containers, and the first thermal storage material charging member is formed of the metal bare material.

3. The heat exchanger with the thermal storage function according to claim 1, wherein in each of the first and second collapsed parts of the collapsed portion of each of the thermal storage material containers, first and second deformed parts of the circumferential wall of the first thermal storage material charging member are in contact with each other, and a recess is formed on the second deformed part to extend over an entire width of the second collapsed part.

4. The heat exchanger with the thermal storage function according to claim 3, wherein as viewed on a transverse cross section which extends along the longitudinal direction of the first thermal storage material charging member and perpendicular to a collapsing direction, a boundary between the first and second deformed parts brought into contact with each other is bent, in the second collapsed part, toward the first deformed part.

5. The heat exchanger with the thermal storage function according to claim 3, wherein in the second collapsed part of the first thermal storage material charging member, a minimum thickness of the first deformed part is smaller than a maximum thickness of the second deformed part.

6. The heat exchanger with the thermal storage function according to claim 3, wherein in the second collapsed part of the first thermal storage material charging member, the recess formed on the second deformed part has a shape of a rectangular groove, and a thickness of the second deformed part at opposite ends of a bottom of the recess with respect to a width direction of the recess is smaller than a thickness at a central portion of the bottom with respect to the width direction.

7. The heat exchanger with the thermal storage function according to claim 3,
   wherein the first collapsed part is provided on a distal end side of the second collapsed part, and
   wherein in the first collapsed part provided on the distal end side of the second collapsed part, one of the first and second deformed parts decreases in thickness toward a distal end thereof.

8. The heat exchanger with the thermal storage function according to claim 3,
wherein the first collapsed part is provided on a distal end side of the second collapsed part, and
wherein in the first collapsed part provided on the distal end side of the second collapsed part, both of the first and second deformed parts decrease in thickness toward distal ends thereof.

9. The heat exchanger with the thermal storage function according to claim 1, wherein each of the first and second collapsed parts of the first thermal storage material charging member has a flat shape as viewed on a transverse cross section perpendicular to the longitudinal direction of the first thermal storage material charging member.

10. The heat exchanger with the thermal storage function according to claim 1, wherein each of the first and second collapsed parts of the first thermal storage material charging member has a U-shape as viewed on a transverse cross section perpendicular to the longitudinal direction of the first thermal storage material charging member.

11. The heat exchanger with the thermal storage function according to claim 1, wherein a boundary between mutually butted deformed parts of the first collapsed part located on a distal end side of the second collapsed part is exposed to opposite ends of the first collapsed part with respect to a width direction thereof as viewed on a transverse cross section perpendicular to the longitudinal direction of the first thermal storage material charging member.

12. The heat exchanger with the thermal storage function according to claim 1, wherein the collapsed portion of the first thermal storage material charging member has two first collapsed parts formed apart from each other in the longitudinal direction of the first thermal storage material charging member, and the second collapsed part formed between the two first collapsed parts.

13. The heat exchanger with the thermal storage function according to claim 1,
wherein the heat exchange tubes comprise flat tubes disposed such that a width direction of each of the flat tubes coincides with an air-passing direction,
wherein the heat exchange tubes are disposed in parallel such that the heat exchange tubes are spaced apart from one another,
wherein air-passing clearances are formed between adjacent heat exchange tubes,
wherein each of the thermal storage material containers comprises a flat container extending in a vertical direction and is disposed such that a width direction of the flat container coincides with the air-passing direction, and
wherein the thermal storage material containers are disposed in the air-passing clearances.

14. The heat exchanger with the thermal storage function according to claim 13,
wherein the heat exchange tubes are provided such that a medium flows through the heat exchange tubes to convey cool,
wherein each of the thermal storage material containers is provided such that a thermal storage material is charged into each of the thermal storage material containers to store cool,
wherein the thermal storage material within each of the thermal storage material containers is to be cooled by cool of the medium flowing through the heat exchange tubes, and wherein the heat exchanger is used as an evaporator with a thermal storage function.

15. The heat exchanger with the thermal storage function according to claim 13,
wherein the heat exchange tubes are provided such that a medium flows through the heat exchange tubes to convey heat,
wherein each of the thermal storage material containers is provided such that the thermal storage material is charged into each of the thermal storage material containers to store heat, and
wherein the thermal storage material within each of the thermal storage material containers is to be heated by heat of the medium flowing through the heat exchange tubes.

16. The heat exchanger with the thermal storage function according to claim 1, further comprising a second thermal storage material charging member having a cylindrical shape,
wherein the second thermal storage material charging member is made of metal and includes a thermal storage material charging passage and an inner circumferential surface formed by a metal bare material,
wherein the second thermal storage material charging member includes a first end and a second end opposite to the first end of the second thermal storage material charging member,
wherein the first end of the second thermal storage material charging member is provided in and brazed to the cylindrical portion of another of the thermal storage material containers,
wherein the second end of the second thermal storage material charging member projects from the cylindrical portion and is collapsed from opposite sides in a radial direction of the second thermal storage material charging member,
wherein a circumferential wall of the second thermal storage material charging member is deformed such that a collapsed portion is formed on the second thermal storage material charging member and the thermal storage material charging passage of the second thermal storage material charging member is closed and sealed,
wherein the collapsed portion of the thermal storage material charging member includes a first collapsed part and a second collapsed part which is adjacent to the first collapsed part of the second thermal storage material charging member in a longitudinal direction of the second thermal storage material charging member and which is greater in degree of collapse than the first collapsed part of the second thermal storage material charging member, and
wherein a relation $T2<T1 \leq 2t$ is satisfied where "t" represents a thickness of the circumferential wall of an uncollapsed portion of the second thermal storage material charging member, "T1" represents a thickness of the first collapsed part of the second thermal storage material charging member, and "T2" represents a thickness of the second collapsed part of the second thermal storage material charging member.

17. The heat exchanger with the thermal storage function according to claim 1, wherein "T1" represents the thickness of the first collapsed part at a first location spaced apart from a distal end of the first thermal storage material charging member, and wherein the first collapsed part decreases in thickness between the first location and the distal end of the first thermal storage material charging member.

18. The heat exchanger with the thermal storage function according to claim 17, wherein at least one side surface of the first collapsed part is sloped from the first location to the distal end of the first thermal storage material charging member.

19. The heat exchanger with the thermal storage function according to claim 1, wherein the first end of the first thermal storage material charging member is joined to the cylindrical portion of the one of the thermal storage material containers by a brazed joint.

20. The heat exchanger with the thermal storage function according to claim 1, wherein the second end of the first thermal storage material charging member is sealed without use of a sealing material.

21. A method of manufacturing a heat exchanger with a thermal storage function, comprising:
preparing a plurality of heat exchange tubes;
preparing a plurality of thermal storage material containers each having a cylindrical portion which establishes communication between an interior and an exterior of each of the thermal storage material containers;
inserting an end portion of a first thermal storage material charging member into the cylindrical portion of one of the thermal storage material containers, the first thermal storage material charging member having a cylindrical shape and being made of metal, the first thermal storage material charging member including a thermal storage material charging passage and an inner circumferential surface formed by a metal bare material;
brazing the first thermal storage material charging member to the cylindrical portion of one of the thermal storage material containers;
brazing the heat exchange tubes and the thermal storage material containers together;
charging a thermal storage material into one of the thermal storage material containers through the first thermal storage material charging member;
preparing a first press die having a single pressing surface extending over an entirety of the first press die;
preparing a second press die having a convex portion at an intermediate position with respect to a longitudinal direction and provided such that an end surface of the convex portion and surfaces of the second press die located on upper and lower sides of the convex portion serve as pressing surfaces; and
collapsing a portion of the first thermal storage material charging member projecting from the cylindrical portion from opposite sides in a radial direction by the pressing surfaces of the first and second press dies so as to deform a circumferential wall of the first thermal storage material charging member such that a deformed part is formed on the first thermal storage material charging member and the thermal storage material charging passage is closed and sealed, a collapsed portion of the first thermal storage material charging member having a first collapsed part and a second collapsed part which is formed adjacent to the first collapsed part in a longitudinal direction of the first thermal storage material charging member and which is greater in degree of collapse than the first collapsed part, a relation $T2 < T1 \leq 2t$ being satisfied where "t" represents a thickness of the circumferential wall of an uncollapsed portion of the first thermal storage material charging member, "T1" represents a thickness of the first collapsed part, and "T2" represents a thickness of the second collapsed part.

22. A manufacturing method according to claim 21, further comprising:
performing press work on two metal plates each formed from a brazing sheet having a core material layer;
brazing material layers covering opposite sides of the core material layer so as to form an outward bulging portion at a portion of at least one metal plate excluding a peripheral edge portion thereof, and so as to provide semi-cylindrical portions at peripheral edge portions of the two metal plates, the semi-cylindrical portions forming the cylindrical portion to establish communication between an interior and an exterior of one of the thermal storage material containers;
combining the two metal plates, to prepare one of a plurality of container forming assemblies, such that an opening of the outward bulging portion of the at least one metal plate faces another metal plate and the cylindrical portion is formed by the semi-cylindrical portions of the two metal plates;
inserting an end portion of the first thermal storage material charging member into the cylindrical portion of one of the container forming assemblies, the first thermal storage material charging member including a thermal storage material charging passage and formed of a metal bare material;
brazing the peripheral edge portions of the metal plates together so as to manufacture one of the thermal storage material containers having the cylindrical portion;
brazing the first thermal storage material charging member to the cylindrical portion of one of the thermal storage material containers; and
brazing the heat exchange tubes and the thermal storage material containers together.

23. A manufacturing method according to claim 21,
wherein the pressing surface of the second press die located on a distal end side of the convex portion comprises a sloping surface which slopes toward the first press die such that a space between the first and second press dies decreases toward a distal end of the sloping surface, and
wherein in the first collapsed part located on a distal end side of the second collapsed part, one of the deformed parts is formed such that a thickness decreases toward the distal end thereof.

24. A manufacturing method according to claim 21,
wherein an upper portion of the pressing surface of the first press die and the pressing surface of the second press die located on a distal end side of the convex portion comprise sloping surfaces which slope toward each other such that a space between the first and second press dies decreases toward distal ends of the sloping surfaces, and
wherein in the first collapsed part located on a distal end side of the second collapsed part, both of the deformed parts are formed such that thicknesses decrease toward distal ends thereof.

25. A manufacturing method according to claim 21, wherein the pressing surface of the first press die and the pressing surfaces of the second press die are made flat.

26. A manufacturing method according to claim 21,
wherein the pressing surface of the first press die has a concave arcuate shape as viewed on a transverse cross section thereof,
wherein each of the pressing surfaces of the second press die has a convex arcuate shape as viewed on a transverse cross section thereof, and wherein a radius of curvature of a transverse-cross-sectional shape of the pressing surface of the convex portion of the second press die is larger than a radius of curvature of a transverse-cross-sectional shape of the pressing surfaces on opposite sides of the convex portion.

27. A manufacturing method according to claim 21, wherein slits are formed in the circumferential wall of the first thermal storage material charging member at positions on a single diametrical line such that the slits extend from a distal end of the first thermal storage material charging member to a region where the second collapsed part is to be formed.

28. A manufacturing method according to claim 21, further comprising:
   inserting an end portion of a second thermal storage material charging member into the cylindrical portion of another of the thermal storage material containers, the second thermal storage material charging member having a cylindrical shape and being made of metal, the second thermal storage material charging member including a thermal storage material charging passage and an inner circumferential surface formed by a metal bare material;
   brazing the second thermal storage material charging member to the cylindrical portion of another of the thermal storage material containers;
   charging a thermal storage material into another of the thermal storage material containers through the second thermal storage material charging member; and
   collapsing a portion of the second thermal storage material charging member projecting from the cylindrical portion from opposite sides in a radial direction by the pressing surfaces of the first and second press dies so as to deform a circumferential wall of the second thermal storage material charging member such that a deformed part is formed on the second thermal storage material charging member and the thermal storage material charging passage is closed and sealed, a collapsed portion of the second thermal storage material charging member having a first collapsed part and a second collapsed part which is formed adjacent to the first collapsed part in a longitudinal direction of the second thermal storage material charging member and which is greater in degree of collapse than the first collapsed part, a relation $T2 < T1 \leq 2t$ being satisfied where "t" represents a thickness of the circumferential wall of an uncollapsed portion of the second thermal storage material charging member, "T1" represents a thickness of the first collapsed part of the second thermal storage material charging member, and "T2" represents a thickness of the second collapsed part of the second thermal storage material charging member.

* * * * *